May 5, 1970 H. L. FITCH ET AL 3,509,959

UNDERWATER SEISMIC EXPLORATION SYSTEM AND FIRING DEVICE AND CHARGE THEREFOR

Filed April 29, 1968 7 Sheets-Sheet 1

HOMER L. FITCH
RICHARD G. GUENTER
HUGO SCHLATTER
*INVENTORS.*

BY S Grant Stewart

ATTORNEY

HOMER L. FITCH
RICHARD G. GUENTER
HUGO SCHLATTER
*INVENTORS.*

BY S Grant Stewart

ATTORNEY

HOMER L. FITCH
RICHARD G. GUENTER
HUGO SCHLATTER
*INVENTORS.*

BY S Grant Stewart

ATTORNEY

HOMER L. FITCH
RICHARD G. GUENTER
HUGO SCHLATTER
*INVENTORS.*

BY S Grant Stewart

ATTORNEY

HOMER L. FITCH
RICHARD G. GUENTER
HUGO SCHLATTER
*INVENTORS.*

BY S Grant Stewart

ATTORNEY

HOMER L. FITCH
RICHARD G. GUENTER
HUGO SCHLATTER
*INVENTORS.*

BY S Grant Stewart

ATTORNEY

HOMER L. FITCH
RICHARD G. GUENTER
HUGO SCHLATTER
*INVENTORS.*

BY S Grant Stewart

ATTORNEY 3,509,959

UNDERWATER SEISMIC EXPLORATION SYSTEM AND FIRING DEVICE AND CHARGE THEREFOR

Homer L. Fitch, Mount Arlington, N.J., and Richard G. Guenter and Hugo Schlatter, Wilmington, Del., assignors to Hercules Incorporated, Wilmington, Del., a corporation of Delaware Filed Apr. 29, 1968, Ser. No. 724,942
Int. Cl. G01v 1/12, 1/13, 1/38
U.S. Cl. 181—.5 29 Claims

ABSTRACT OF THE DISCLOSURE

The invention provides:

Figure 1:
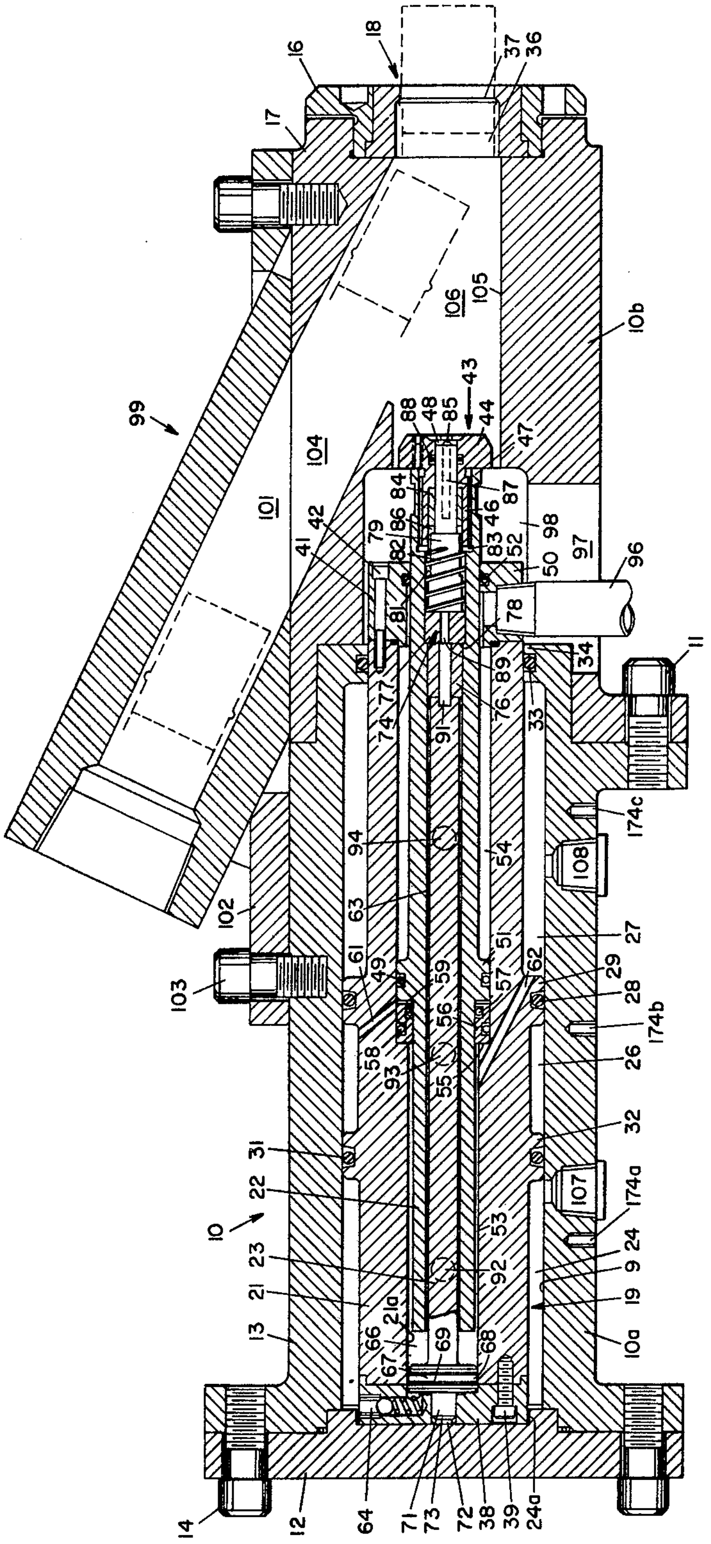

(1) A marine seismic system, in which explosively operated charges are initiated at a submersed firing station and then allowed to travel from the firing station for detonation outside the system;

(2) A firing mechanism as a now preferred firing station (per se, and also as a component of the above system) containing a combination of piston and muzzle structure for sequentially receiving, emplacing and initiating percussion initiatable seismic charges and then ejecting the initiated charges for detonation outside mechanism. Single, double and triple piston assemblies are disclosed;

(3) A marine seismic method including the steps of submersing a firing station, transporting charges to, and initiating them in, the firing station, and allowing the initiated charges to travel from the firing station for detonation;

(4) A seismic cartridge unit, including booster well and seismic charge, having an external configuration for adaptation in the above firing mechanism; and, (5) A complete seismic cartridge assembly comprising the above cartridge unit, and additionally, a percussion initiatable primer device, with delay fuse and with the explosive charge preferably of the NCN type.

Preferred embodiments utilize ejector means coupled to initiator means, for ejecting the initiated charges from the firing station for detonation; and, preferably, the system is applied to utilization of percussion initiatable NCN type charges containing a delay fuse in the primer element to delay the detonation until after the initiated charge is delivered from the system.

This invention relates to a seismic exploration system for firing explosive charges under water to generate a seismic record. In one aspect this invention relates to a marine seismic system for rapid delivery of explosively operated charges to an underwater firing station and initiation of the charges therein, with subsequent detonation outside the system. In another aspect this invention relates to a firing device for sequentially receiving, emplacing, and initiating percussion initiatable seismic explosive charges under water and for then ejecting the initiated charges for detonation outside the device. In another aspect this invention relates to a system for generating seismic disturbances in a body of water including the above described firing device as a submersed firing station. In another aspect, this invention relates to a seismic cartridge unit for association with a percussion initiated primer device and to a resulting complete percussion initiated seismic explosive charge assembly for firing in the above-described firing device. In still another aspect this invention relates to a method for marine seismic exploration providing for initiation of explosively operated charges within a system above described, and for subsequent detonation outside the system. Other aspects will be apparent in light of the accompanying disclosure and of the appended claims.

Seismic exploration involves the introduction of energy into the earth to initiate wave action for determination of characteristics of subsurface structures. Seismic exploration is based on the generation of sound or seismic waves in the earth's surface which are reflected or refracted from buried strata interfaces and the like. It has been general practice, in the past, to detonate high explosives as the energy source for seismic exploration inasmuch as the energy generated provides for excellent seismic records. Unfortunately, in offshore exploration, shock energy from detonation of high explosives, particularly in large amounts, is unduly damaging to certain marine life including many of the important food and game species. Transport of high explosive seismic charges to the offshore seismic shooting site is subject to the limited quantity that governing authorities permit on the loading dock at any one time to minimize the safety hazards involved, which, in turn, limits the amount of high explosives that can be handled on the dock and impairs the efficiency at which the explosives can be loaded across the dock and transported to the exploration site. Particularly for these reasons the industry, in offshore practice, has turned to the use of the nitrocarbonitrate (NCN) type seismic charges.

In offshore seismic exploration practice, the complete seismic charges are assembled on deck of a boat moving through the test area and then emplaced from the boat and detonated. General offshore technique in the handling of NCN charges on board ship has involved inserting a primer into the charge, inserting an electrically actuated detonator into the primer, attaching a depth control (float and string) to the assembled charge, and placing the charge in the water. Concurrently the boat travels at about six knots for a period sufficient to place a predetermined length of firing cable (position locater). Each such cycle requires a minimum of about two minutes, and accordingly, requires large charges, generally of from 50 to 100 pounds, in order that a sufficiently strong signal be emitted at each test point.

The use of such large NCN charges is disadvantageous in many respects, viz. (1) explosive force from each detonation imparts damage to the hydrophone cable unless the cable is carried at a great distance from the detonation, and accordingly, general practice has been to utilize an additional boat for the cable thus incurring marked increase in costs; (2) a large quantity of these charges is necessarily maintained aboard ship which, in addition to the safety hazards involved, is economically undesirable from the standpoint of space, already at a premium, that must be available for storage; (3) such charges are of size and weight that they are difficult to handle aboard ship and particularly in heavy seas; and they require extensive manpower for loading at the dock and for being handled aboard ship for assembly and emplacement; (4) use of large NCN charges, in some instances, results in unduly high fish kill; and (5) communication lines from the boat deck to the charge, and auxiliary equipment, are always susceptible to becoming entangled to impair success of the shot, sometimes resulting in loss of the charge.

Numerous attempts, involving use of underwater mechanical devices, have been made to more rapidly assemble and position the charges to thereby reduce charge size and overcome the above disadvantages. However, such practice has been limited due to damage imparted to the mechanism by force of the resulting detonation except in those instances where the quantity of the charge has been limited to about 1/10 pound or less at which level the energy of the seismic signal is substandard.

This invention is concerned with a system for generating seismic disturbances in a body of water, providing for delivery of small seismic charges into the water at a predetermined fixed depth for positioning and shooting at short cycle times to provide energy for a strong seismic record, thereby eliminating need for large seismic charges and the attendant disadvantages inherent in their use; the system further providing for initiation of the charges, at an underwater firing station thereof, with subsequent detonation outside the system to thereby preclude damage that might otherwise be imparted to the firing mechanism. The invention is further concerned with a firing device towable through a marine area, as a unit of the above described system, for rapidly and sequentially receiving, emplacing and initiating small seismic charges and for then delivering the initiated charges to an external point for detonation; and for doing so at a rate providing energy necessary for compensation of that normally delivered by larger, but less frequently fired, charges. The invention is still further concerned with seismic cartridge units and with complete seismic explosive charge assemblies containing same, which can be conveyed to, and fired in, the above described firing device.

In accordance with the invention, a system is provided for generating seismic disturbances in a body of water, said system including storage means for storing a supply of explosively operated charges; a submersed firing station for receiving said charges; means for loading said charges from said storage means into said firing station; initiating means for initiating said loaded charges; and means for delivery of each initiated charge from said firing station, to outside said system, for subsequent detonation. In accordance with a now preferred embodiment, the system of the invention includes a movable surface platform, such as a deck of a movable boat, the explosive charge storage means being supported thereon; conduit means connecting the platform with the firing station; means on the platform for loading the stored explosive charges into the conduit means, and for then moving the loaded charges to the firing station; means on the firing station for initiating said charges therein; and means operatively associated with the charges for delaying the detonation of each initiated charge for a predetermined time interval to permit delivery of same from the firing station for the subsequent detonation.

In general practice, (1) the system of the invention includes ejecting means coupled to the initiator means for ejecting the initiated charges from the firing station into the body of water for subsequent detonation and (2) is applied to utilization of percussion initiable NCN type seismic charges containing a delay fuse in the primer element to delay the detonation until after the initiated charge is delivered from the firing station for detonation outside the system. Any suitable means can be utilized, in combination with the above described system, for detecting water pressure variations, resulting from shock of the detonation, and converting same into electric signals for recording.

As a now preferred firing station for the above described system, and also as a component thereof, the invention provides a firing mechanism, or device, for receiving percussion initiatable seismic charges and initiating and ejecting same for subsequent detonation which comprises a housing; a muzzle member extending from within said housing to the outside thereof and adapted to receive, and contain, said charges with a percussion sensitive portion thereof facing the housing interior; means in direct communication with the outside of said housing and with said muzzle member for conveying percussion initiatable cartridge assemblies thereto so as to be received and contained in said muzzle member as described; a piston assembly within said housing aligned with said muzzle member along a path extending therethrough from the housing interior to the outside thereof, and movable along said path (a) from a position spaced from said muzzle member to contact each said charge, when contained in said muzzle member as described, so as to percussion initiate and then eject same to outside said housing and (b) from ejection contact with said charge to said spaced position; and means for communicating fluid pressure actuating means with said piston assembly to move same along said path.

The system containing the above described firing mechanism comprises, in preferred practice, a movable surface platform, conduit means for conveying percussion initiatable seismic charges from said platform to the firing mechanism; means on said platform for sequentially loading said conduit means with said charges, and for then moving said charges therethrough; and the above described housing, and assembly therein, connecting with said conduit means for sequentially receiving said charges therefrom, and percussion initiating and then ejecting same for detonation outside the system; fluid pressure generating means on said platform connecting with said piston assembly; and means for regulating flow of fluid under pressure from said generating means to actuate travel of said piston assembly along the above described path.

Further, in accordance with the invention a method, for generating seismic disturbances in a body of water, is provided which comprises the steps of storing a supply of explosively operated charges on a platform; submersing a firing station in said body of water; transporting said charges to said firing station, and then initiating said charges; and allowing the initiated charges to move from said firing station into a predetermined zone outside said firing station for detonation. In one embodiment, the seismic exploration method of the invention includes the steps of utilizing, as a platform, a single boat for carrying recording and processing equipment; coupling a streamer cable to said boat for detecting water pressure variations caused by seismic disturbance; transporting explosively operated charges from the boat to a submersed firing station, and initiating said charges therein; and then allowing the initiated charge to move from said firing station for detonation in a zone external thereto.

In preferred practice of the seismic exploration method of the invention, detonation of the initiated charges is delayed by the presence of a delay fuse in the primer element to allow the charges to move from the firing device for subsequent detonation outside the system; and, during the period of delay each initiated charge is ejected from the zone of initiation into the external detonation zone. Thus, the method of the invention, in general practice, comprises the steps of generating successive seismic disturbances in a body of water by (1) initiating explosively operated charges at predetermined distances below the surface of the body of water; (2) delaying the detonation of each said initiated charge; and (3) during the resulting period of delay, ejecting each said initiated charge from the initiation zone into a zone external thereto for detonation; and detecting, with a plurality of spaced detectors, water pressure variations caused by said seismic disturbances.

Further in accordance with the invention a seismic cartridge unit, for association with a percussion initiatable primer device and percussion initiation in a firing device above described is provided, which comprises a cartridge shell, and means for enclosing at least a portion of the interior of said shell including a wall closure member; an explosive charge within the closed shell portion; a primer well extending, closed end first, into said closed shell portion through said wall member into operative contact with said explosive charge for support of a percussion initiatable primer device therefor and supported at its open end in said wall member; and said cartridge shell containing a protruding side portion for engaging an external stop means therefor during travel of same through a passageway.

Still further in accordance with the invention, a complete percussion initiatable seismic charge assembly for support and initiation in a firing device and ejection therefrom prior to the detonation is provided, which comprises the above described cartridge unit and, additionally, a percussion initiatable primer device for the explosive charge extending, percussion sensitive portion last, into the primer well into priming contact relationship with the explosive charge, and terminating within the well so as to dispose the percussion sensitive portion thereof outside the closed shell interior at least flush with the exterior open end surface of the well member, and said primer device containing a fuse composition for delay of its priming action to thereby delay detonation of said explosive charge after percussion initiation of said primer. In preferred practice of this embodiment the above described wall closure member for the cartridge shell is positioned from an end of the shell to form a resulting open recessed shell end portion. The recessed portion facilitates handling of the cartridge assembly in practice of other embodiments of the invention.

The exploration system of the invention comprises, in preferred practice, a suitable towboat for towing the above described firing mechanism through the water body and supports a cartridge loading means on the boat deck together with fluid pressure generating means such as one or more hydraulic fluid pumps or air compressors connecting with the necessary communication lines for supplying the required fluid pressure to the firing device under tow. A cartridge loader of any suitable design for sequentially accepting the individual cartridges, including means for then receiving fluid under pressure for forcing travel of the cartridge from the loader into the conveying means to the firing device can be utilized. Suitable paravane structure is associated with the firing device to facilitate towing. The conduit means for conveying cartridges from the deck of the towboat to the firing device is formed from any suitable flexible material, a fiber reinforced rubber tubing material being often advantageously employed. It (the conduit means) connects directly with the cartridge loader for sequentially receiving and conveying individual cartridges and with the firing mechanism at the underwater end for delivery of the cartridges. From the standpoint of convenience all communication lines from the pressure generating means are advantageously secured to the main cartridge conveying line to facilitate ease in handling of those lines during travel of the system through the water body.

The firing station of the system of the invention, in now preferred practice, is a firing mechanism above described and contains, as the piston assembly, a combination of three pistons in concentric relationship, the intermediate of which is moved in response to hydraulic fluid pressure to support emplacement of the cartridge previously received and emplaced in the muzzle for percussion firing, the innermost piston being then moved in response to separate fluid pressure, generally air pressure, to move into contact with the percussion sensitive portion of the charge in percussion initiating relationship therewith after the position of the charge assembly in the muzzle is stabilized for the initiation. The outermost piston is then moved, in response to fluid pressure from the same source, as a driving force for the ejection, in correlation with the travel of the other two pistons. By regulation of the direction of flow of fluid under pressure, the piston assembly is driven to and from the muzzle member to maintain the desired sequence of operation.

The passageway means in the housing wall for sequentially conveying cartridges into the housing preferably opens into the housing in a section adjacent the muzzle assembly preferably at an angle causing the incoming cartridge to strike the opposite inner wall of the housing and glance toward, and into, the muzzle. However, any suitable means for conveying cartridges from outside the housing for the muzzle member can be utilized.

The muzzle member, aligned with the piston assembly, generally contains, or is associated with, suitable means for detaining travel of the cartridge therethrough to retain it for action of the piston assembly above described. However, a muzzle member without, or unassociated with, such detention means is within the scope of the invention as more fully described hereinafter. The now preferred detention means in the muzzle member is advantageously a shoulder or ring member extending peripherally along the inner wall of the muzzle in a plane substantially normal to the line of travel of the cartridge and is generally integral with the muzzle member. In this embodiment the shoulder member engages a protruding side wall portion of the cartridge, the latter being preferably a ridge type protrusion from the cartridge side wall. Other suitable detention means associated with the muzzle member are provided as described hereinafter.

The complete explosive cartridge assembly of the invention, which is a combination of the above-described seismic cartridge unit and a percussion initiatable primer device, is percussion initiated and contains protrusion means on its outside wall, or at either end thereof, for engaging muzzle member retention means so as to be retained and supported in the muzzle assembly for initiation. Preferably the detention means is a peripherally extending ridge integral with the cartridge shell although the cartridge shell can advantageously be lipped at the rearward end to form a suitable protruding member for engaging the rearward portion of the muzzle. The cartridge shell optionally contains a recessed rear end portion for more readily facilitating initiation and contact with the piston assembly, and for protecting the percussion sensitive end of the complete assembly from initiation by accidental impact such as might be incurred by dropping the complete charge during handling on the boat deck.

Figure 1A:
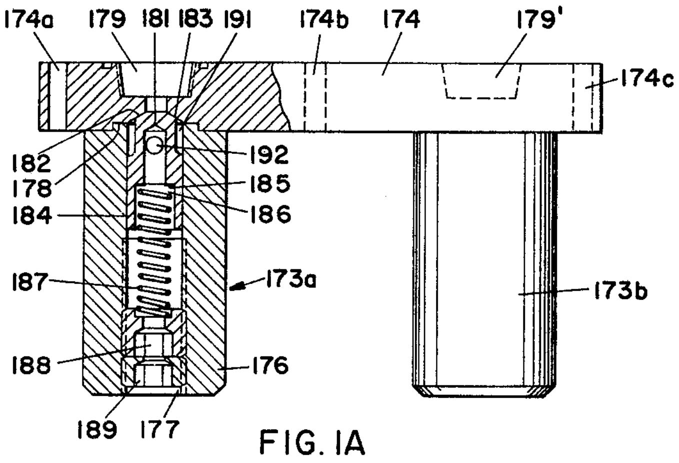
Figure 2:
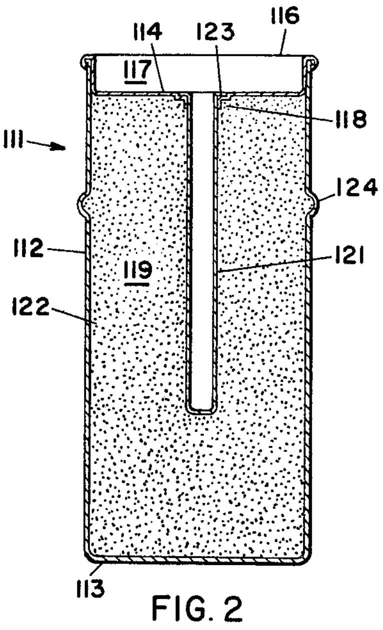
Figure 3:
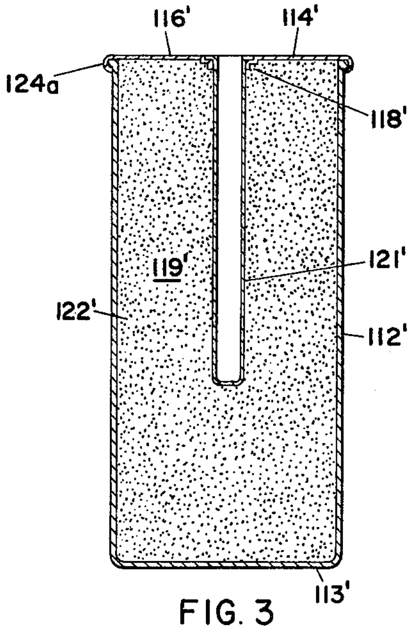
Figure 4:
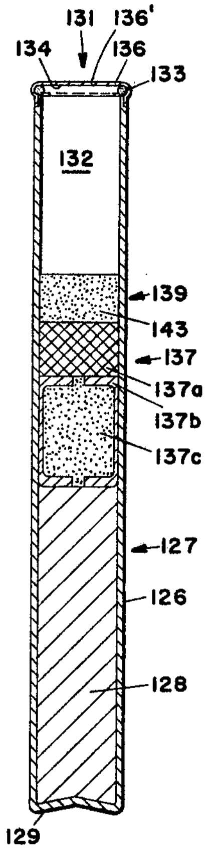
Figure 4A:
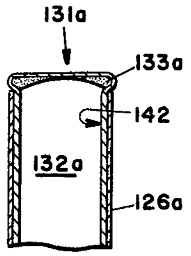
Figure 4B:
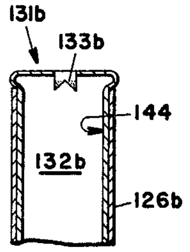
Figure 6B:
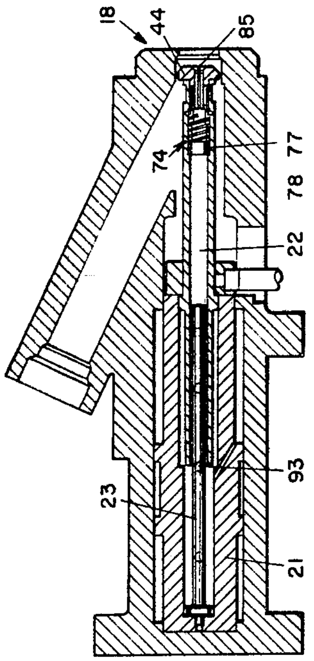
Figure 6D:
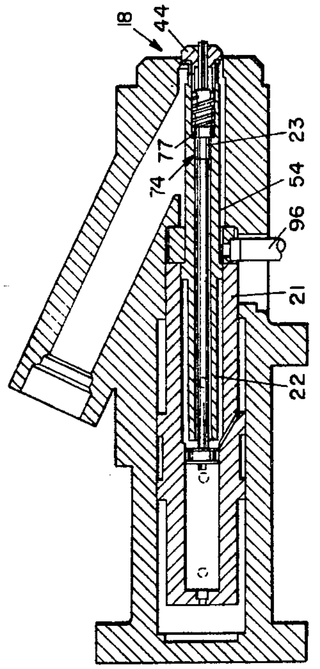
Figure 7B:
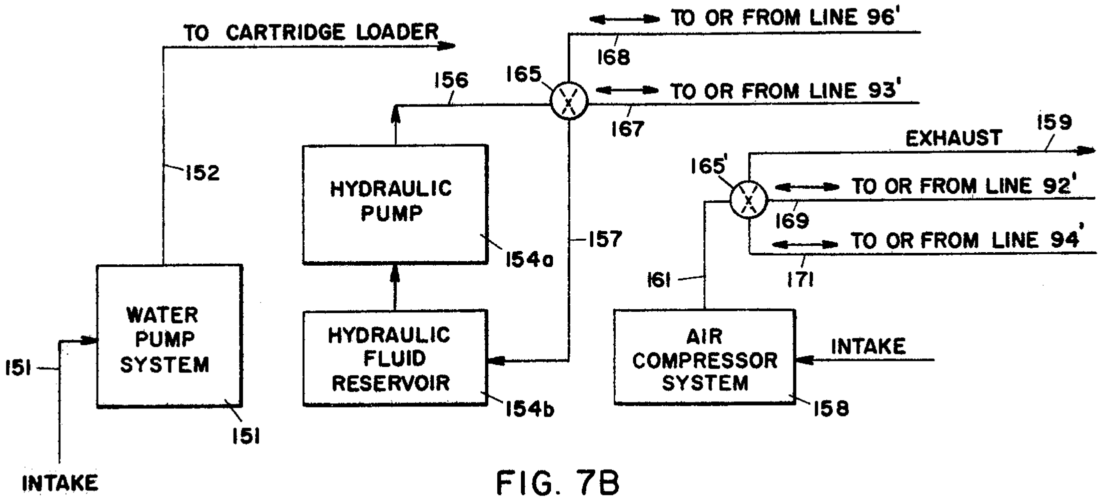
Figure 7A:
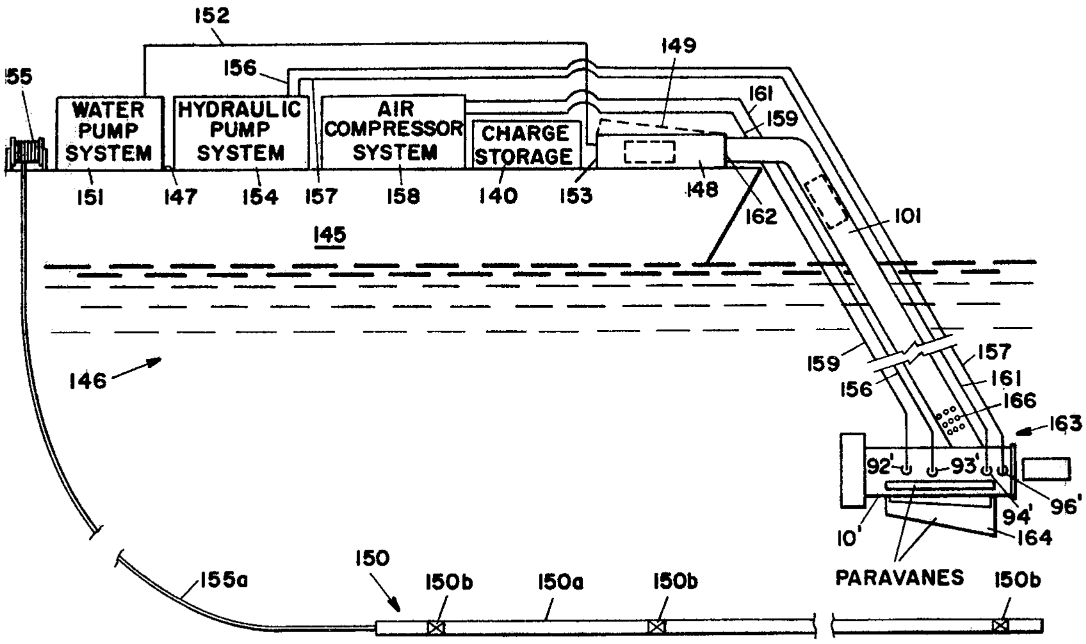
Figure 8A:
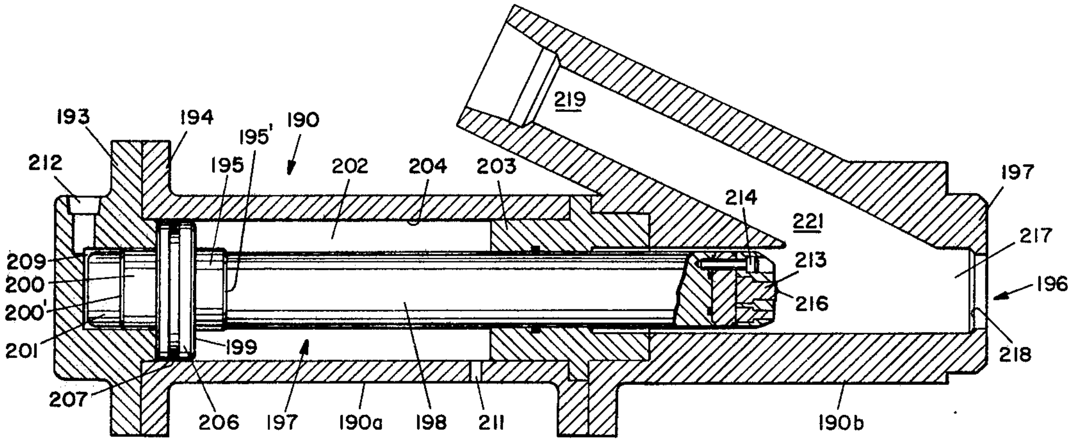
Figure 8B:
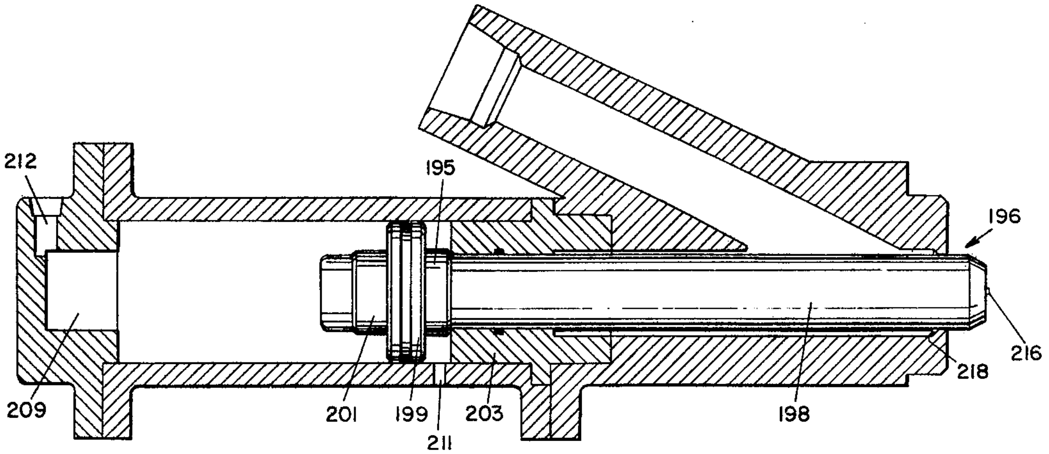
Figure 9A:
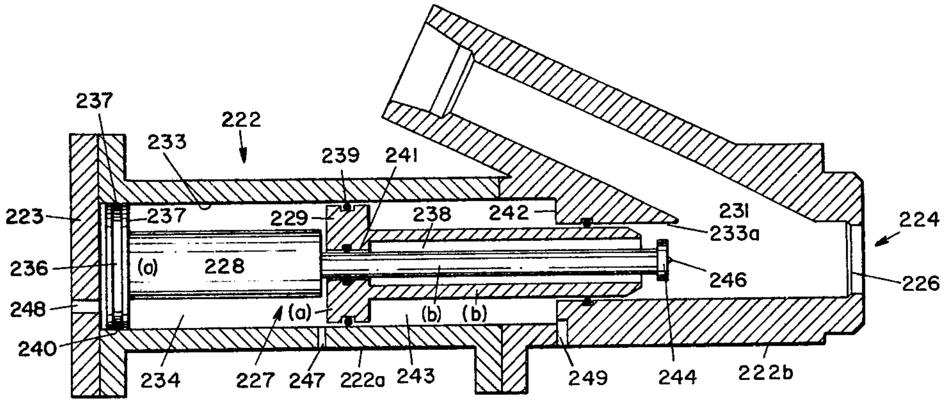
Figure 9B:
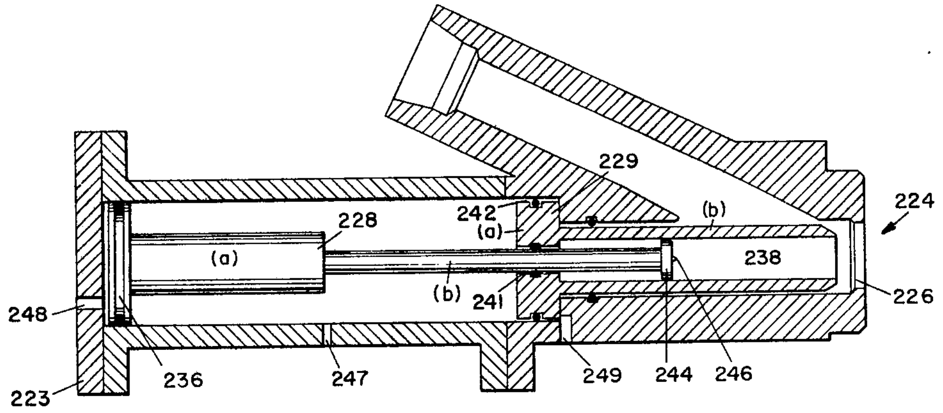
Figure 9C:
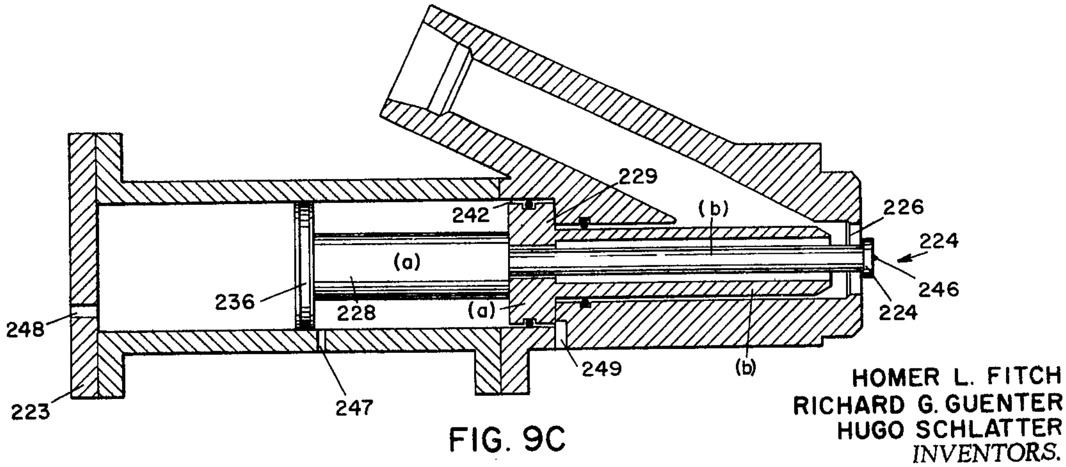

The invention is further illustrated with reference to the drawings of which FIG. 1 is a view in cross section of a firing mechanism, or device, now preferred, as a firing station of the system of the invention; FIGS. 2 and 3 are views in cross section of now preferred cartridge units, each for association with a percussion initiatable primer to provide a complete seismic charge for firing in a firing mechanism such as that of FIG. 1, and FIG. 1A is a view of a now preferred normally closed pressure actuated valve assembly for attachment to the housing of the firing device of FIG. 1, in open communication with the interior of the housing for removal of water inadvertently admitted while the device is in operation; FIGS. 4, 4A and 4B are views in cross section showing a priming device and specific embodiments thereof which, together with a cartridge unit of the invention such as that of either of FIG. 2 or 3, provides a complete percussion initiatable seismic charge assembly of the invention, the latter shown in cross section with reference to FIG. 5; FIGS. 6A–6D are views illustrating coaction of the individual piston members of the piston assembly of the firing device of FIG. 1; FIG. 7A diagrammatically shows a now preferred embodiment of the system of the invention including a firing device of FIG. 1 in combination with a towboat for towing the firing device through the water body and suitable control means on the boat deck with associated communication lines to the firing device, and FIG. 7B is a diagrammatic showing of fluid flow in the fluid pressure actuated system of FIG. 7A; FIGS. 8A and 8B are views of an embodiment of piston assembly in a firing device of the invention involving use of a single piston; and FIGS. 9A, 9B and 9C are views of an embodiment of piston assembly in a firing device of the invention utilizing a double piston combination.

Referring to FIG. 1, closed elongated housing 10 consists of rear and forward elongated sections 10*a* and 10*b* respectively, joined flangeably by flange screws 11. Housing 10 contains rear end closure plate 12 flangeably secured to rear end 13 by threaded flange screws 14; and contains forward end closure cap 16 threadably secured to forward end 17 and comprising muzzle structure 18 described more fully hereinafter.

Piston assembly 19 consists of three cylindrical pistons in concentric relationship, viz. outermost, intermediate and innermost pistons 21, 22 and 23 respectively in substantially coaxial alignment with housing 10. Each said piston is indvidually movable along the axis of housing 10 in response to force of fluid pressure as described hereinafter.

Outermost piston 21, concentric with pistons 22 and 23 and hence perforate along its axis for containing piston 22, extends in spaced relationship with the inner wall 9 of housing 10 to form a resulting annulus about the piston 21 periphery. Piston 21 is supported in the spaced apart relationship at several points by O-ring structure to divide the annulus space into three separate annulus sections, namely, sections 24, 26 and 27 fluidtight from each other. Thus O-ring 28, in a central part of the annulus, is supported in channel support 29 integral with piston 21 and extends about the entire periphery of piston 21, in fluidtight contact with the outer wall of piston 21 and in fluidtight slidable contact with the inner wall of housing 10; O-ring 31 in the annulus intermediate O-ring 28 and rear end 13 of housing 10 is supported in channel support 32 integral with piston 21 and extends about the periphery of piston 21 in fluidtight relationship with the outer wall of piston 21 and in fluidtight slidable contact with the inner wall of housng 10; and O-ring 33, in the annulus, forward or O-ring 28 is supported in channel support 34 integral with housing 10 and extends about the periphery of piston 21 in fluidtight slidable contact relationship with the outer wall of piston 21 and in fluidtight contact with the inner wall of housing 10. The spacings of O-ring 31, 28 and 33 provide the fluidtight separate annulus sections 24, 26 and 27 above referred to.

End cap closure 16 together with opening 36 extending therethrough coaxially with housing 10 and shoulder 37 in a forward section in opening 36 extending peripherally about the inner wall forming opening 36, comprises muzzle assembly 18.

Muzzle member 18 is so designated because it is adapted to receive, and support, an explosive charge assembly, conveyed into housing 10, for initiation and then ejection to the outside of the housing for the detonation. As described more fully hereinafter the explosive charge assembly to be supported in muzzle member 18 has an outwardly protruding side portion generally a rib member peripherally disposed around a rear section of the cartridge as an integral part of the cartridge shell, which, when the cartridge assembly is moved into muzzle member 18, engages shoulder 37 which functions as a stop member to retain the cartridge assembly in the muzzle for initiation.

Piston 22, coaxially disposed in concentric relationship with piston 21 is spaced from the inner wall 21*a* of piston 21 to form a resulting annulus about the periphery of piston 22. Piston 22 extends forwardly from its concentric relationship with piston 21 toward muzzle member 18 through forward end retainer cap 41 of piston 21, the latter secured to piston 21 by threaded bolts 42, as a forward endmost section of piston 21.

Cap member 43 at the forward end 47 of piston 22 consists of head member 44 and externally threaded shank 46 integral therewith, threadably secured to the inner wall of piston 22; and contains perforation 48 extending therethrough coaxially with piston 22.

Cap member 43, coaxial with opening 36 of muzzle member 18 is dimensioned, and spaced from opening 36 of muzzle 18 so as to be projectable into and substantially through opening 36 in response to forwardmost travel of piston 22.

O-ring 49 in the annulus around piston 22 extends entirely about the periphery of piston 22 intermediate the ends thereof, and is supported in channel support 51, integral with piston 22, in fluidtight relationship with the outer wall of piston 22 and in fluidtight and slidable contact relation with the inner wall of piston 21. O-ring 52, in the annulus around piston 22 and at the forward end 41 thereof, extends peripherally around piston 22 and is supported in channel support 50, integral with piston 21, in fluidtight and slidable contact relationship with the outer wall of piston 22 and in fluidtight contact with the inner wall of piston 21. The O-ring seals 49 and 52 divide the annulus around piston 22 into two separate annulus sections 53 and 54, each fluidtight from the other and successively disposed in that order from the rear of the housing 10.

Double O-ring support 56, as a stationay element of piston 21, is disposed in the annulus around piston 22, in closing relationship therewith peripherally around piston 22 at a point rearward of O-ring 49, and immediately adjacent ring 49 when piston 22 is in its rearwardmost position relative to piston 21. Support 56, stationary with reference to the inner wall of piston 21, contains O-ring 57 in fluidtight relationship therewith and in fluidtight and slidable contact with the outer wall of piston 22, and O-ring 58 also in fluidtight relationship therewith and with the inner wall of piston 21. The portion of the annulus around piston 22 and containing support 56 is of width greater than the remaining rearward portion to provide a suitable adjacent and rearward support 55 for stationary support means 56, which blocks rearward motion of piston 22 with reference to piston 21 when the latter is in its rearwardmost position. Support 56 and O-rings 57 and 58 therein together with guide member 51 and O-ring 49 supported therein, separate the annulus around piston 22 into separate annulus sections 53 and 54 extending forwardly in that order, when pistons 21 and 22 are in their rearwardmost positions.

Support member 56 contains groove 59 peripherally extending around piston 22 directly facing piston 22 and channel support member 51 in open unobstructed and fluidtight contact therewith. Passageway 61 extends through the wall of piston 21 connecting with annulus section 26 and groove 59. Passageway 62 also extending through the wall of piston 21 connects annulus sections 53 and 27.

Piston 23 extends spaced apart, in its concentric position, from the inner wall of perforate piston 22 to form a resulting annulus 63 peripherally around piston 23. Piston 23 extends from its concentric relationship with piston 22 toward the rear 13 of housing 10 through adjacent open space 66 formed by the inner wall of piston 21. End portion 67 of piston 23, rearward of open space 66, extends radially in contact along its entire periphery with the inner wall of piston 21. O-ring 68 about the outer periphery of piston end portion 67 of piston 23 is supported in channel support member 69, an integral part of piston portion 67, in fluidtight relationship therewith and in fluidtight slidable contact with the inner wall of piston 21. Piston 23 terminates in rearwardmost end section 71, i.e. rearwardly of radially extended portion 67.

Retaining cap 38 is secured to the rearward end of piston 21 as a rear end closure therefor by threaded screws 39. Closure 38 contains normally closed spring loaded valve 64 with its inlet end in open communication with annulus 24 and its outlet end in open communication with the rear side of piston portion 67; and it contains at least one passageway 72 extending diametrically across its rearward side. Closure 38 is spaced along its periphery from the inner wall of the end closure 12 portion of housing 10 to provide a resulting annulus 24*a* in direct communication with passageway(s) 72, passageway(s) 72 being thereby in direct open communication with annulus 24.

End closure 38 also contains an opening 73 extending coaxially therethrough from direct communication with passageway(s) 72, and adapted to accept substantially the entire piston portion 71 when piston 23 is in its rearwardmost position in housing 10.

Piston 23 forwardly extends in piston 22, in its concentric relationship therewith, to a point short of the end of piston 22. The perforation of piston 22 carrying piston 23 is however forwardly extended, with some modifications, described hereinbelow, to provide for additional forward travel of piston 23.

Firing pin assembly 74 is disposed in the end of piston 22 in the perforate space therein forward of, and immediately adjacent piston 23. Annulus 63 terminates short of the forward end 76 of piston 23 to permit end 76 to serve as a support bearing for piston 23. Forward of end portion 76 of piston 23, the diameter of the perforate portion of piston 22 is increased to contain rear end portion 77 of pin assembly 74 to provide shoulder, or stop 78 rearward of assembly 74 and integral with piston 22. Intermediate section 79 of assembly 74 is of reduced diameter to form a resulting annulus 81 with the inner wall of piston 22 for presence of coil spring 82 peripherally about member 79. Coil spring 82 is supported at its rearward end against member 77 and at its forward end against the rearward end of shank 46 of closure member 43.

Annulus 81 is in communication with space 83 adjacent cap member 43 and terminates forwardly in space 86 rearwardly of adjacent bearing 84 which serves as a bushing for the remaining forward section of assembly 74 within, and extending through, cap member 43. Pin member 85 extends forwardmost from assembly 74 just short of the forward face of cap member 43 when piston 23 is rearwardmost. As shown by the dotted lines in forwardmost end 87 of assembly 74, pin member 85 is extended coaxially into a perforate portion of piston end 87 and is friction supported therein so as to be easily replaceable.

Forwardmost end 87 of assembly 74 is supported in fluidtight relationship with the inner wall of member 43 in head member 44 by O-ring 88 peripherally extending around member 87 in fluidtight slidable contact with forward section 87 and in fluidtight contact with cap member 43.

Rearwardmost section 77 of assembly 74 contains grooves 89 longitudinally extending along the outer surface thereof; and forwardmost section 76 of piston 22 contains grooves 91 longitudinally extending along the outer surface thereof, both grooves 89 and 91 being in direct communication with each other and with annulus 81 and hence in direct communication with annulus sections 53 and 27.

Conduits 92, 93 and 94 extend through a wall of housing 10 into direct open and unobstructed communication with annulus sections 24, 26 and 27 respectively. Conduit 96 immediately rearward of O-ring assembly 52–50 extends successively through slot 97 in housing 10 and the wall of piston 21 into direct and unobstructed open communication with annulus 54. Slot 97 extends through the side wall of housing 10 encompassing conduit 96 and opening into cavity 98 and extends longitudinally in the wall of housing 10 a sufficient distance to provide for longitudinal travel of piston 21 containing conduit 96 secured thereto, along the necessary path therefor in cavity 98.

Conduit assembly 99 consists of conduit 101, for delivery of explosive cartridge assemblies into the housing 10, supported on plate 102 secured to the housing 10 by threaded screws 103. Conduit 101 extends in a forward direction in alignment with passageway 104 in a side wall of housing 10 which opens in a forward section in housing 10 adjacent muzzle assembly 18. As illustrated by the dotted figures the cartridge assemblies are sequentially conveyed by conduit 101 via passageway 104 into housing interior section 106 and caused to impinge against the side wall 105 of housing 10 opposite opening 104 and adjacent to assembly 18 to thereby be deflected in line of travel so as to enter opening 36 of muzzle 18.

As further illustrated hereinafter, the cartridge assembly shown (in dotted lines) contains a ridge member about its outer periphery and integral therewith, which upon forward travel of the cartridge assembly through opening 36 engages shoulder 37 to terminate the forward travel of the cartridge. At this point the cartridge is emplaced for firing. The concentric piston assembly 19 as shown in FIG. 1, is in its rearwardmost position in housing 10, which is rearward of the rearwardmost point of ingress of opening 104 into housing 10 to permit sequential delivery of the cartridge assembly into the muzzle member. Upon emplacement of the cartridge in the muzzle assembly, piston assembly 19 is forwardly movable to engage head member 44 and the pin member 85 with the thus emplaced cartridge assembly to initiate same and then eject it for detonation outside the housing, as described in further detail below.

Conduits 107 and 108, closed as shown, are available for connecting with an optional valve system for discharge of any water from housing 10 inadvertently admitted during operation of the firing device which is, for the most part, that carried into the firing device in air under pressure when the latter is utilized as an activating pressure fluid in operation of the piston assembly.

Normally closed spring actuated valve 64 is optionally utilized in the operation of the firing device in FIG. 1, and opens in response to development of fluid pressure at a predetermined level in annulus 24, e.g. at about 90 p.s.i.g. Valve 64 is advantageously applied to more closely control relative forward travel of pistons 21 and 23, of which piston 21 is the heavier. Valve 64 is advantageously utilized in those instances in which, for any reason, there may be inadvertent delay of initial forward travel of piston 21.

Valve 64, at pressures below the preset level in annulus 24, serves to permit communication of annulus 24 with piston 21 but to block communication of annulus 24 with piston 23 to initiate some forward travel of piston 21, i.e. at the lower pressure levels, ahead of that of piston 23. In response to pressure at the preset level in annulus 24, valve 64 opens to provide full communication of annulus 24 with both pistons 21 and 23 for their forward travel. Under these conditions any delay in initial forward travel of piston 21 is compensated for and piston 21 reaches its forwardmost position during the allotted time; and the lighter piston 23 forwardly travels, normally, at a rate higher than that of piston 21 to timely reach its forwardmost position.

Other alternatives may be utilized in place of, or in conjunction with, valve 64 as a means for controlling the relative forward travel of pistons 21 and 23. For example, a spring loaded detention member mounted within closure 38 of piston 21 and bearing against a depression in end portion 71 of piston 23 can be utilized to delay the point in time when piston 23 moves forward relative to piston 21.

With reference to FIG. 2 is shown a now preferred embodiment of the seismic cartridge unit of the invention for association with the percussion initiatable primer device and percussion firing in a firing mechanism of the invention containing a shoulder type muzzle stop such as stop 37 of muzzle system 18 of FIG. 1. Referring to FIG. 2, seismic cartridge unit 111 comprises elongated cartridge shell 112 closed by any suitable bottom end closure member 113 and by opposite wall closure member 114 spaced from open top end 116 to form a resulting top recessed shell portion 117 in direct and unobstructed open communication with the outside of shell 112.

End closure 114 contains passageway, or opening, 118 extending therethrough to directly communicate recess 117 and interior shell portion 119. Well member 121 extends closed end first through opening 118 into operative contact with seismic charge 122 of the NCN type to support a primer device in detonating relationship therewith; and is supported at its open end in wall 114 in watertight relationship therewith in any suitable manner, generally by support of its integral lipped open end 123, on the exterior surface of the wall closure 114 immediately adjacent opening 18, often within a recessed portion of wall 114 immediately adjacent and surrounding opening 118, as illustrated.

Ridge member 124 extends peripherally and outwardly from cartridge shell 112, preferably as an integral part thereof in a plane generally normal to the cartridge shell axis and at a point intermediate the ends of the cartridge and closer to top end 116. Ridge member 124 generally extends outwardly from the remaining exterior surface of shell 10 a distance in the order of from 0.07 to 0.08 inch.

With reference to FIG. 3 in which parts corresponding to those of FIG. 2 are shown by the same, but primed, numbers is illustrated another embodiment of the seismic cartridge unit (for association with a percussion initiatable primer device) which is the same as that of FIG. 2 except that the wall closure 114', including opening 118' and primer well member 121', secured at its lipped open end 123' to wall 114', is disposed as a closure for shell 112 at the top end 116' thereof. Protruding ridge member **124*a* is peripherally disposed around shell 112' at the top and is of substantially the same dimension as that of member 124 of FIG. 2. Ridge member 124*a* is advantageously formed during manufacture of cartridge shell 122 by forming a peripheral flange about the end of the shell and then rolling the flange back to form the resulting peripherally disposed ridge, or bead, 124*a*** at the top end of the cartridge shell.

Protruding ridge, or wall portion, members such as 124 and **124*a* of FIGS. 2 and 3 serve as detention members for engaging detention structure, such as shoulder 37 of FIG. 1, associated with the muzzle member (e.g. member 18, FIG. 1) to detain the cartridge assembly for emplacement, initiation and ejection, as above described. Any suitable protruding cartridge wall portion can be utilized as detention means and can be located at any point on the cartridge wall or at the open end as desired, and the presence of recessed structure, e.g. recess 117**, is optional, although it is advantageously utilized in preferred practice.

Although in preferred practice the protruding wall portion, as a detent, on the exterior surface of the shell of the cartridge unit, e.g., ridge member 124 of FIG. 2 is outwardly protruding, it can be inwardly protruding into the shell, e.g., as a peripherally extending groove about the outside wall of the shell. In that embodiment the muzzle assembly contains a suitable detent element for the cartridge assembly such as a spring actuated bolt member, in the side wall, normally spring biased to extend into the muzzle member in a direction substantially normal to the longitudinal axis thereof a sufficient distance to be forced to retract against the spring biasing force in response to initial contact with the forward traveling cartridge assembly in the muzzle but to spring into biased locking contact with the groove member when the groove is disposed in direct alignment therewith. The ejection force of the firing device then overcomes the spring biasing force to cause retraction of the detent and the subsequent ejection.

With reference to FIGS. 4–4B is illustrated a percussion initiatable primer device utilized in practice of the invention as a primer element in combination with a cartridge unit of FIGS. 2 and 3 to provide a complete percussion initiatable seismic explosive charge assembly of the invention.

With reference to FIG. 4 elongated shell 126 of primer device 127 contains a high explosive base charge 128 such as PETN, adjacent closed end 129. Wall or cap closure 131 is disposed in any suitable manner on, and across, top open end portion 132 of shell 127 in closing relationship therewith. Ignition charge 133 in shell 127 is supported in confinement, in any suitable manner, on wall 131 such as in a partially closed cavity 136 about the entire periphery of cap closure 131. Inasmuch as open end 132 is adjacent the ignition charge 133 and communicates charge 133 with the remainder of the components of the device it (open portion 132) is also referred to herein as the ignition end 132 of shell 126.

Confined ignition charge 133 is any suitable ignition composition which ignites to produce a flame in response to compression resulting from percussion applied to the exterior surface 136' of closure cap 131. Primer charge 137 in shell 126 is any suitable primer composition intermediate high explosive charge 128 and ignition charge 133. Delay fuse 139, of composition and design conventionally used in electric delay blasting caps, comprises in preferred practice a suitable pressed delay fuse composition 143. The particular fuse composition, the degree of press of the fuse composition, and the length and diameter thereof, determine the time of burning; and in most instances, selection of a specific fuse composition 143 and correlation of same with the remaining variables is such as to provide a delay in burning time in the order of from 0.5 to about 1.5 seconds.

Delay fuse composition 143 is ignitible in response to direct contact with flame emitted from ignition of ignition charge 133 and is spaced in such ignitible relationship therewith. Primer composition 137 is detonatable in response to heat and flame emitted from burning of delay fuse composition 143 and is disposed subjacent delay fuse 143 in detonating relationship therewith. High explosive charge 128 is detonatable in response to detonation of primer 137 and is disposed subjacent primer 137 in that detonating relationship.

In the primer device such as illustrated with reference to FIG. 4, primer charge and base charge components are advantageously those utilized as such in the blasting cap art, for example, base high explosive charges such as pentaerythritol tetranitrate, pentolite, cyclonite, tetryl, RDX and cyclotol, and primer charges such as diazodinitrophenol, lead azide and mercury fulminate; confined ignition charge components include potassium perchlorate, lead styphnate, mercury fulminate, antimony sulphide and lead azide, and mixtures of such materials, as are well known in the munitions art, and are preferably those often utilized as the "primer" charge in 0.22 caliber rifle cartridges; and delay fuse compositions include those normally utilized as such in the delay blasting cap art, those now preferred including lead oxide/boron, 98/2; red lead/boron 98/2; barium peroxide/tellurium/selenium 40/40/20; barium peroxide/selenium 84/16; and barium peroxide/tellurium 60/40. Delay fuse assemblies, well known in the delay blasting cap art, comprising a metal tube, generally lead, containing the fuse composition pressed in the core, are also advantageously utilized as the delay element in the primer assembly.

In preferred practice primer charge 137 comprises a diazodinitrophenol wafer **137*a* pressed above, and superposed on elongated capsule 137*b* which extends within and substantially coaxially with shell 126 in closing, or near closing, relationship therewith. Capsule 137*b* is open at each end and is superposed on base charge 128 and contains a second diazodinitrophenol charge 137*c* of density lower than that of primer wafer 137*a*. Wafer charge 137*a* is of sufficiently high density to be ignitible in response to contact with flame from ignition of delay fuse composition 143 as above described and diazodinitrophenol charge 137*c* is of sufficiently low density to be detonatable in response to heat developed by ignition of wafer charge 137*c* to thereby in turn cause detonation of base charge 128**.

Although the complete seismic charge assembly of the invention contemplates any suitable percussion initiator means therefor, FIGS. 4A and 4B, in which each lettered index number refers to a like part of FIG. 4 identified therein by the same, but unlettered number, show now preferred structure. With reference to FIG. 4A, the ignition end **132*a* of shell 126*a* is closed by a conventional rim-fired empty primed rifle cartridge casing 142, which includes end closure 131*a* with charge 133*a* for rim firing; and with reference to FIG. 4B the ignition end 132*b* of shell 126*b* is closed by a conventional center fired empty primed rifle cartridge casing 144 which includes end closure 131*b* with charge 133*b* for center firing. Shell casings 142 and 144 are of outside diameters sufficiently less, respectively, than the inside diameters of shells 126*a* and 126*b*** to provide, in each instance, for an interference or friction fit of the casing closure in the primer shell.

A complete percussion initiatable seismic charge assembly of the invention is illustrated with reference to FIG. 5 which shows, as the now preferred embodiment, the cartridge unit of FIG. 2 containing a rim-fired percussion initiatable primer of FIGS. 4 and 4A positioned in the primer well. All primed index numbers of FIG. 5 refer to like parts of FIGS. 2, 4 and 4A identified by the same but unprimed index numbers. Thus as further illustrated with reference to FIG. 5, primer assembly 127′ extends into primer well 121″, percussion end **131*a*′ last, and terminates in detonating contact with main charge 122″ in cartridge shell 112″. Primer assembly 127′ is preferably disposed entirely within cartridge interior 119″ except to permit the primer end closure 131*a*′, at its outside surface, to be at least flush with the exterior surface of the open end of well 121″ in cartridge closure 114″ and preferably to permit both primer closure 131*a*′ and the ignition 133*a*′ thereon to protrude from primer well 121″ and end closure member 114″ into recessed area 117′ to facilitate application of percussion force by the piston assembly of the firing device, to the exterior of closure 131*a*′ for compression and ignition of the charge 133*a*′**.

When utilizing an empty prime rim-fired or center-fired rifle cartridge case as an enclosure for the primer device of the assembly of FIG. 4, the rifle case portion can be of any desired length, such as in the order of about ⅜ inch; and from about 0.3 to 0.4 grain of the ignition charge is generally employed although the amount is variable dependent upon the particular ignition and the primer charges contemplated. The primer device 127, generally cylindrical, is in most embodiments from about 2¼ to 3 inches in length by about 0.236 to 0.238 inch in diameter.

The amount of high explosive base charge 128 in an assembly 127 of FIG. 4 is generally greater than that utilized as base charge in a conventional No. 8 blasting cap. For example, the amount of PETN, as explosive charge is generally in the order of from 0.8 to 1.5 grams as compared with the conventional amount of 0.4 gram utilized as base charge in a No. 8 electric blasting cap. The amount of primer charge, e.g. charge 137 (**137*a*+137*c*) is generally about the same as utilized in a conventional No. 8 blasting cap, e.g. from 0.28 to 0.30 gram. The amount, degree of press and dimensions of delay fuse 143** in an assembly of FIG. 4, is dependent on the correlation of those variables with the desired burning rate, from 0.3 to 0.4 gram of delay fuse composition often being utilized.

Figure 5:
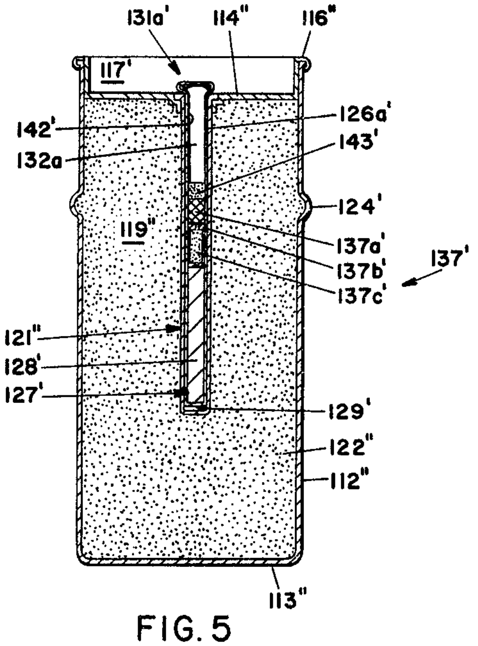

The following is a tabulation of data exemplary, and further illustrative of a complete percussion initiatable seismic charge assembly of the invention, all index numbers referring to like numbered parts of FIG. 5.

PRIMER UNIT

Metal shell **126*a*′**—metal-cylindrical
- Length, inches—2.98
- Diameter, inches:
  - inside—0.22
  - outside—0.24

Ignition end closure **131*a*′**—Empty, primed rim-fired cartridge case for 0.22 cal. short ammunition
Delay fuse 143′:
- Fuse powder $BaO_2$/Te/Se/Pb-Sn (32/32/16/20[1])
  - Pressed, p.s.i.—4700
  - Grams—0.4
  - Length, inches—0.16
  - Diameter, inches—0.22
  - Spaced from ignition end, inches—0.43

[1] Pb/Sn, 85/15.

Primer-Ignition 137′:
- Diazodinitrophenol, grams—0.29
  - above capsule (**137*a*′**)—pressed at 3700 p.s.i.
  - below capsule (**137*b*′)—loose Base charge 128′**:
- PETN, grams—1.5—pressed at 3700 p.s.i.

CARTRIDGE UNIT

Metal shell 112″—metal-cylindrical
- Length, inches—4.68
- Diameter, inches:
  - inside—2.04
  - outside—2.09
- Recess 117′, inches:
  - length—0.41
- Detent ridge 124′, inches:
  - Distance from wall closure 114″—0.97
  - Protrusion from shell 112″—0.07
  - Width at base—0.19
  - Contour of external surface—circular NCN charge 122″:
- Weight, grams—250
- Length, inches—3.27
- Diameter, inches—2.04
- Composition, wt. percent:
  - Ammonium nitrate—78.7
  - DNT—5.0
  - Fuel oil—1.5
  - Particulate aluminum—14.8

A percussion initiatable primer device and a complete explosive cartridge assembly containing same as the primer element, are disclosed and claimed in the application of Fitch and Hamilton Ser. No. 673,594, filed Oct. 9, 1967.

In preferred practice, the main charge of the complete seismic charge assembly is a nitrocarbonitrate by which term ("nitrocarbonitrate") is meant there are no sensitizers or other ingredients in that composition which are high explosives, and the mixture will not detonate with a No. 8 blasting cap when packed for shipment.

Nitrocarbonitrate type explosive charges, as is well known, contain at least one inorganic oxidizer salt, a fuel, and a suitable sensitizer together with various other well known ingredients such as one or more of an antiset agent, water repellent coating material or the like. Most often ammonium nitrate is the chief inorganic oxdizer salt ingredient alone, or with sodium nitrate or other suitable inorganic oxidizer salts. Further exemplary of inorganic oxidizer salts that can be used alone or together with ammonium nitrate as the inorganic oxidizer salt ingredient of nitrocarbonitrates are alkali metal and alkaline earth metal nitrates and perchlorates (including ammonium) as for example sodium nitrate, magnesium nitrate, calcium nitrate, potassium nitrate, barium nitrate, sodium perchlorate, ammonium perchlorate, calcium perchlorate and magnesium perchlorate. Well known sensitizer materials for nitrocarbonitrates include DNT and particulate aluminum alone or together with suitable fuels such as, for example, powdered coal, fuel oil, ferrosilicon, ferrophosphorous and the like. The following formulations (weight percent bases) are further illustrative of nitrocarbonitrate type charges above described and now preferred in practice of the invention:

| | A | B | C | D | E | F |
|---|---|---|---|---|---|---|
| Ammonium nitrate[1] | 82 | 91 | 86 | 79 | 91 | 78 |
| Sodium nitrate | | | | 10 | | |
| DNT[2] | | 5 | | 5½ | 5 | 5 |
| Aluminum[3] | 6 | | 10 | | | 12 |
| Fuel oil | 4 | | | 1½ | | 1 |
| Ferrosilicon | 8 | | | | | |
| Ground Coal | | 4 | 4 | 4 | 4 | 4 |

[1] Ground prills, formulations A, B, C and D; granular, formulations E and F.
[2] Dinitrotoluene oil, formulations B, D and E; solid dinitrotoluene, formulation F.
[3] Flake, formulations A and C; granular, formulation F.

The generally preferred nitrocarbonitrates contain (weight basis) from about 75 to 95 percent total inorganic oxidizer salt and at least 5 percent of a suitable sensitizer component together with a separate fuel component when desired. More often ammonium nitrate, preferably in the form of ground prills, is the only inorganic oxidizer salt although it can be advantageously utilized as such, in an amount of from 75 to 90 percent together with from about 1 to 15 percent sodium nitrate. Now preferred sensitizer components are DNT oil, DNT solids, particulate aluminum, and mixtures of any two or more thereof, in a total amount of from about 5 to 20 percent, at least about 5 percent of the particulate aluminum being flake. Also, in preferred practice, the nitrocarbonitrate charge contains, as a separate fuel component, fuel oil, ground coal, granular aluminum or a mixture of two or more thereof, in any suitable amount, generally from 2 to 15 percent.

When referring herein to small nitrocarbonitrate seismic charges, it is meant those which generally have a weight from ⅛ to 3 lbs. and a diameter of at least ½ inch and usually not exceeding about 3 inches. However, in some off-shore exploration areas, a nitrocarbonitrate charge of any suitable size can be utilized and indeed the explosive charge can be a dynamite or other suitable high explosive.

Operation of the firing device of FIG. 1 is illustrated with reference to FIGS. 6A–6D inclusive which depict, in skeleton detail, various positions of the individual piston members of the piston assembly 19 during operation of the firing device to receive, initiate and eject a complete explosive cartridge assembly for detonation. Each of FIGS. 6A, 6B, 6C and 6D, although in less detail, shows the device of FIG. 1 in a different stage of operation. In several instances in the description of FIGS. 6A–6D, reference is made in terms of index numbers to parts not specifically shown therein, but shown in FIG. 1. All parts of each of FIGS. 6A–6D inclusive are like parts of those of FIG. 1 and are identified by like index numbers to facilitate reference to FIG. 1.

Figure 6A:
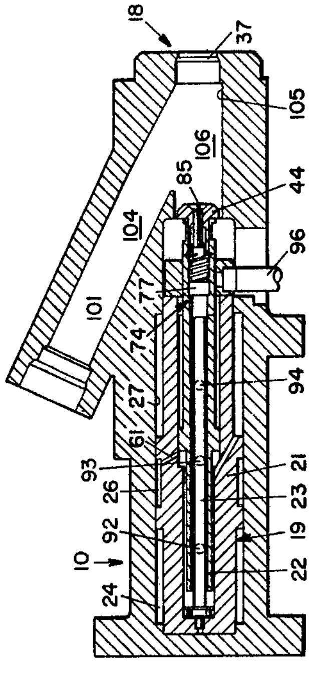

Referring to FIG. 6A, the entire piston assembly 19 is positioned at its rearwardmost point of travel in housing 10, as also shown in FIG. 1, and in that position is rearward of the point of ingress of passageway 104 into housing interior section 106 adjacent muzzle member 18.

As illustrated with reference to FIG. 1, the complete cartridge asembly, e.g., a complete assembly of FIG. 5, is passed, percussion end last, from above the water body via conduit 101 and passageway 104 into housing section 106 against the inner housing wall 105 opposite the point of ingress of passageway 104, and then by its momentum its line of travel is deflected into muzzle member 18. Forward travel of the cartridge assembly in muzzle 18, percussion sensitive end last, is stopped by blocking engagement of the ridge detent about the periphery of the cartridge shell with shoulder 37 in muzzle 18 to thereby emplace the cartridge in position for the initiation.

With the cartridge assembly emplaced in muzzle member 18 and piston assembly 19 at its rearwardmost point of travel in housing 10, fluid under pressure, preferably a hydraulic fluid, at, say, from 750 to 1000 p.s.i.g. is introduced via conduit 93 into annulus section 26 and, via passageway 61, is directed into groove 59 and into direct contact with fluid-tight O-ring support member 51 to move piston 22 forwardly. As piston 22 moves forward, wall portion 78 of the inner wall of piston 22 engages pin assembly 74 so that, piston 22, pin assembly 74 and head member 44 move as a unit toward the muzzle assembly 18, with travel of head 44 (including the forward end of firing pin assembly 74) into the recessed end portion of the emplaced cartridge assembly in muzzle 18. In this position, pin member 85 is fully retracted to a point within head 44, and recessed relative to the outer surface of head 44; and head 44 imparts compression against the rear closure member of the cartridge assembly thereby causing it (the cartridge assembly) to be firmly supported against shoulder 37 in emplacement for initiation. The position of piston assembly 19 at this stage is shown with reference to FIG. 6B, i.e., the position in response to fluid pressure actuation of piston 22 communicated via conduit 93 and annulus 26.

At the stage shown in FIG. 6B, pistons 21 and 23 are still in their rearwardmost positions, At this point fluid, under pressure, generally air at a pressure of, say 100 to 140 p.s.i.g. is introduced into annulus 24 via conduit 92 into open communication via annulus **24*a* and grooves 72, with rearwardmost end portion 71 of piston 23. In response to force of fluid pressure in grooves 72 imparted via conduit 92 in the wall of housing 10, piston 23 is swiftly moved in its concentric relationship with piston 22 through the space vacated by pin assembly 74 into direct contact with the rearmost portion 77 of pin assembly 74 to drive pin assembly 74 and pin 85 at the forward end thereof, into contact with the percussion cap end of the cartridge assembly in muzzle 18, under force of percussion sufficient to cause ignition of the ignition composition and hence to initiate the main explosive charge in the emplaced cartridge assembly. The position of the piston members of piston assembly 19 at this stage is illustrated with reference to FIG. 6C which shows head member 44 together with pin assembly 74, engaged in the recessed portion of the cartridge assembly, as above described, and additionally, with pin assembly 74 in its advanced position, including pin member 85, in percussion firing contact with the cartridge assembly in muzzle 18**.

At this stage, burning of the delay fuse is underway to delay detonation of the base charge in the primer element to provide time for ejection of the thus initiated cartridge assembly, from the housing, for detonation at a point away therefrom, i.e., to eliminate possibility of damage to the firing device that might be incurred by detonation of the main charge with the cartridge supported in the muzzle. Upon forwardmost positioning of piston 22, as illustrated with reference to FIG. 6C, and during burning of the delay fuse, pressure of fluid in annulus 24 via conduit 92 (against channel support 32) causes piston 21 to move forwardly. Since annulus 26 is pressurized, piston 22 and head 44 also move forward, forcing the cartridge assembly forward and past the detent (shoulder member 37) and causing the cartridge to be ejected forceably from the muzzle to the outside of the housing. Shortly thereafter, the delay period has expired and the detonation of the seismic charge in the exploration area outside the housing has been accomplished. This stage is illustrated in FIG. 6D which shows the entire piston assembly 19 advance to its forwardmost position with head 44 outside muzzle 18 for completion of ejection of the previously initiated cartridge assembly.

Piston assembly 19 is then returned to its rearwardmost position in housing 10 by reversal of the direction of fluid flow via conduits 92 and 83 in annulus sections 24 and 26 by introducing fluid under pressure via line 96 into annulus 54. Conduits 92 and 93 are opened for release of fluid, initially introduced into housing 10 to forwardly move the individual members of the assembly 19 and displaced by the rearwardly moving pistons. Hydraulic fluid, under pressure is introduced into annulus 54 via conduit 96 to cause rearward travel of piston 22, and air under pressure is introduced into annulus 27 via conduit 94 to cause rearward travel of pistons 21 and 22. During forward travel of piston assembly 19 conduits 94 and 96 are open to exhaust and hydraulic fluid reservoir respectively. Conduit 96 secured to the end of piston 21 moves as a unit of piston 21 through slot 97 and cavity 98.

Coil spring 82 compressed against shank 46 of closure 43 when pin assembly 74 is in its forwardmost position, biases pin assembly 74 for rearward travel to force it rearwardly in response to rearward travel of piston 23.

A now preferred embodiment of the system of the invention for generating seismic disturbances in a body of water, is illustrated with reference to FIGS. 7A and 7B, and utilizes as the firing station, a firing device of the invention, specifically illustrated with reference to FIG. 1. The system of FIGS. 7A and 7B provides for emplacement and initiation of relatively small percussion initiatable explosive cartridge assemblies, such as of FIG. 5, at a predetermined water depth, and for detonation of the charges outside this system by ejection of the initiated charges from the firing device during the delay period caused by burning of the delay fuse.

Howver, it is to be understood that the system of the invention contemplates any combination of suitable submersed firing station means with auxiliary means outside the water body, for loading explosively operated charges in the firing station, and initiating the loaded charges therein with travel of the initiated charges from the firing station for detonation outside of the system. Thus, although the invention, in preferred practice, contemplates a system containing delay means associated with the charges to provide time for travel of the initiated charges from the firing station for detonation outside the system, such as delay fuse structure above described, it is within the scope of the invention to include any suitable means in the system for initiating explosively operated charges at the firing station with detonation outside the system. Similarly, it is within the scope of the invention to include any suitable means within the system for allowing travel of the initiated charges from the firing station for detonation outside the system, althrough ejection means, above described, is now preferred.

Referring to FIG. 7A, on deck 147 of towboat 145 is storage means 140 for storing a supply of percussion initiatable seismic explosive cartridge assemblies; cartridge loader 148 with hinged top closure 149; water pump system 151, connecting at its discharge side via line 152 with the interior of loader 148 at the rear 153 thereof; hydraulic pump system 154 connecting with lines 156 and 157; air compressor system 158 connecting with conduits 159 and 161, and reel means 155 for support of a streamer cable assembly further described hereinafter. Conduit 101 (the same as of FIG. 1) connects with cartridge loader 148 at the front end 162 thereof for sequentially receiving cartridge assemblies therefrom, which have been loaded into loader 148 from storage through the hinged open top 149. Conduit 101 extends from loader 148 to below the water surface and into the firing device 163, as the submersed firing station, which in practice of the presently illustrated embodiment, is the firing device of FIG. 1. Hence, in this embodiment, like parts of firing device 163 (including those not specifically shown, but shown in FIG. 1) and the firing device of FIG. 1 are identified in FIG. 7A by the same, but primed, index numbers.

Conduit 101 connects with, or extends as part of, passageway 104' into firing device 163. Lines 156 and 157 extend from hydraulic pump system 154 to conect respectively with conduits 93' and 96' of firing device 163; and lines 159 and 161 extend from air compressor system 158 to connect with conduits 92' and 94' respectively of firing device 163. Firing device 163 is towed by boat 145 and it (device 163) is stabilized in its direction of travel at the predetermined depth by suitable paravane means 164 attached to the exterior of housing 10'.

When referring diagrammaticaly to FIG. 7A, specific water pump, hydraulic pump and air compressor systems 151, 154 and 158 include numerous pipes, valves, flow control means and combinations of such equipment associated with the operation of each, and are contemplated in each system. Any suitable combination of such known devices can be utilized with the operation of these systems in conjunction with communication of same with the firing device 163, as is clear in light of the schematic showing of FIG. 7B which illustrates one such embodiment of operation controls on deck of boat 145.

Thus, with reference to FIG. 7B in which like numbers refer to like parts of FIG. 7A, and with piston assembly 19' of device 163 in its rearwardmost position, and the complete seismic charge in loader 148 ready for emplacement in firing device 163, water is delivered from a suitable water pump system 151 via line 152 into rear end 153 of loader 148 under sufficient force against the charge therein to move it from loader 148 into conduit 101 and, via conduit 104' into device 163 for emplacement in the muzzle assembly. As the charge travels through conduit 101, it forces water, already present in the conduit, through perforations 166 (see FIG. 7A) in the wall of conduit 101 and also through cavity 98' and slot 97' of FIG. 1 to further facilitate delivery and emplacement of each separate charge in firing device 163. After the cartridge in conduit 101 has entered the firing device, perforations 166 also serve to vent water in conduit 101, from pump system 151, still moving with momentum that might otherwise unduly sustain rate of travel of the charge into the firing device and impair its emplacement in the muzzle assembly.

Hydraulic pump system 154 of FIG. 7A includes hydraulic pump **154*a* and separate hydraulic fluid reservoir 154*b*. Upon emplacement of the charge in the firing device, hydraulic fluid is delivered by hydraulic pump 154*a* via line 156, 4-way valve 165 and line 167, to conduit 93' of assembly 163 to actuate forward travel of piston 22 and firing pin assembly 74 as illustrated with reference to FIG. 6B. Pressure in lines 156 and 167 is maintained during subsequent operation of the pistons 21 and 23. Concurrently conduit 96' is open for return of hydraulic fluid from the housing 10' to the hydraulic fluid reservoir 154*b* in system 154 via lines 168, 4-way valve 165 and line 157**.

Figure 6C:
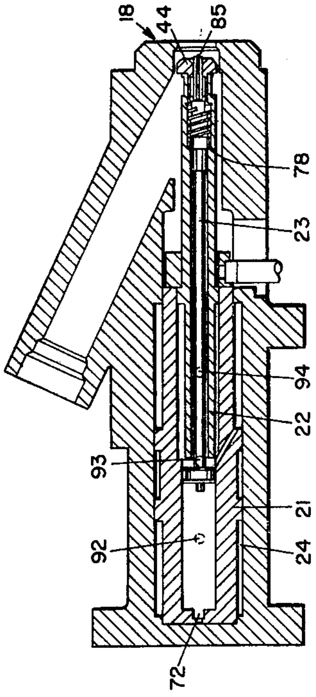

With piston 22' in forwardmost position, air under pressure from air compressor system 158 via line 161, 4-way valve 165' and line 169 is passed to conduit 92' of device 163 for actuation, via annulus 24', of forward travel of piston 23' as illustrated with reference to FIG. 6C. As piston 23' travels forwardly, air, forward of piston 23', is displaced from housing 10' via conduit 94' open to line 171 and exhaust 159 via 4-way valve 165'.

After piston 23' is moved forwardly, as illustrated with reference to FIG. 6C, pressure of air in lines 161 and 169 delivers the required force via conduit 92' into annulus 24' to forwardly move piston 21 as illustrated with reference to FIG. 6D.

At this stage, the entire piston assembly 19 is in its forwardmost position; and it (assembly 19) is returned rearwardly for emplacement of the next cartridge from line 101 by reversal of the direction of flow of streams of FIG. 7B. Thus, flow of hydraulic fluid via line 156 is diverted from line 167 into line 168 via 4-way valve 165' to deliver fluid under pressure into annulus 54' via conduit 96' of device 163; and flow of hydraulic fluid in line 167 is diverted via 4-way valve 165 and line 157 into reservoir **154*b*. This provides force of pressure in annulus 54' in device 163 to cause piston 22 to travel to its rearwardmost position. Similarly, flow of air from line 161 is diverted into line 171 via 4-way valve 165' into annulus 27' via conduit 94' to provide force of pressure for rearward travel of pistons 21' and 23'; and air is exhausted from housing 10' via annulus 24', conduit 92' and line 169 via 4-way valve 165' and line 159**.

Seismic streamer cable assembly 150, of conventional design, comprises a hydrophone cable **150*a* together with a plurality of hydrophone groups 150*b* integrally connected in spaced apart relationship along the entire length of cable 150*a*. Streamer cable assembly 150 is connected at one end, by tow cable 155*a*, to reel assembly 155, mounted on deck 147, for reeling and towing. Suitable well-known means (not shown) are associated with streamer cable assembly 150 to stabilize its position at a predetermined depth in the body of water; and suitable means (not shown) for communicating hydrophone groups 150*b* with recorder means on the boat deck, extend from within cable 150, alongside tow cable 155*a* via reel assembly 155** to recorder means (not shown).

In practice, streamer assembly 150 is towed through the water body during which time the seismic charges are detonated outside the system at predetermined intervals, and distances, to initiate seismic shock at the predetermined points in the test area. Disturbances produced by the shot, or shock, are detected by the hydrophone groups which convert those pressure variations into electric signals which are then communicated to the boat for recording.

Further exemplary of marine seismic exploration practice in accordance with the invention is utilization of a seismic stream cable assembly 150 of FIG. 7A of about 7000 feet in length and containing an array of 24 hydrophone groups **150*b*, the stream cable assembly 150** being disposed at a suitable water depth as for example in order of from 10 to 20 feet.

It is to be understood that the complete seismic exploration system of the invention illustrated diagrammatically with reference to FIGS. 7A and 7B contemplates, in its generic aspects, any combination of control and firing means providing for rapid delivery of small seismic charges to an underwater seismic exploration area followed by initiating the charge within the system for detonation in the underwater area at a point outside the system.

With further reference to FIGS. 7A and 7B, and by way of further illustration of one embodiment of operation of the seismic exploration system of the invention, the firing mechanism is towed behind a seismic shooting recording boat at approximately 7 knots along a survey line at an optimum depth below the surface of the water (e.g. 10–40 feet depth). The operator on the deck—

(1) Inserts the charge into the cartridge loader and closes the loader;

(2) Opens a ball-valve allowing water to flow through the delivery conduit moving the charge to the firing mechanism (time elapsed—5.2 to 6.0 seconds);

(3) Moves ball valve control to "off" position, stopping flow of water and moves hydraulic fluid valve control to forward position moving the piston 22' in the mechanism forward, engaging and holding the charge with the head member 44';

(4) Moves air flow valve control to "forward" position upon command from recorder, causing firing pin to strike the percussion element in the charge, actuating the primer. Charge is immediately ejected from the mechanism ($\frac{1}{50}$ to $\frac{1}{32}$ second delay) by action of the air actuated piston 21. Charge (detonation delayed) detonates after reaching separation distance of 7 to 9 feet from the mechanism (distance a function of boat speed, time required to eject the charge and time delay in the primer); and (5) Moves both hydraulic fluid and air control valves to "back" position returning mechanism to original or "load" position and the cycle is repeated.

Although in preferred practice, system and method of the invention involve ejection of the initiated charges for detonation outside the system, ejection is not required. Thus, by way of illustration, compressed air can be introduced into the firing station forward of the charge to provide an aspirating force in response to which the initiated charge is allowed to travel from the firing station to outside the system; or, the charges can be initiated as they pass through a muzzle assembly, devoid of detent means, and then allowed to continue travel through the muzzle to outside the system, under their own momentum, or alternatively, in response to dynamic force of the water medium through which the firing station is towed. Another alternative involves presence in the charge assembly of means for causing the charge to have a density either greater than, or lower than, that of the water body in which the system is in operation so that the charge, after initiation, can be allowed to travel to outside the system either by sinking or rising from the firing station.

In the seismic exploration system of the invention small NCN charges can be utilized, of which the weight and composition can be controlled to total energy output within a narrow range, e.g. ±10 percent, and depth of the firing device can be closely controlled, e.g. to ±3 feet at 40 feet. These features of the system provide for unexpectedly close control of the size and oscillation period of the gas bubble formed when the charge is detonated, such that the signal generated by collapse of the bubble can be recognized and deleted from the seismic trace by suitable computer programming.

As described hereinabove, during underwater operation of the firing device of the invention, it can be expected that frequently there will be some ingress of water into the housing to impair optimum function of the piston assembly. Water gaining ingress into the firing device is generally brought in as a component of one or more air streams introduced to function as a fluid actuating means for the piston assembly. In any event, it is desirable to remove the water from the housing without serious interruption of the operating cycle. This is advantageously done by suitable pressure responsive spring actuated valve means at the exterior of the housing and connecting through the housing wall in communication with the annulus section(s) therein from which the water can be withdrawn. A now preferred valve assembly for that purpose is illustrated with reference to FIG. 1A.

FIG. 1A shows a pair of pressure actuated valve assemblies **173*a* and 173*b* which are identical and hence only one (173*a*) is shown in cross section. Housings of assemblies 173*a* and 173*b* are connected, fluidtight, at their open, and top, ends to plate 174 in alignment with openings 179 and 179' of plate 174 for attachment to housing 10 of FIG. 1. Support plate 174 contains spaced apart openings 174*a*, 174*b* and 174*c* extending therethrough for support of threaded screws in engagement with internally threaded openings 174*a*', 174*b*' and 174*c*' in the external wall of housing 10 of FIG. 1 to thus secure plate 174 to the housing with valve assemblies 173*a* and 173*b* in open fluidtight communication, at their open ends, with conduits 92 and 94 of housing 10**.

Each valve assembly **173*a* and 173*b* (with reference to assembly 173*a*) comprises elongated housing 176, containing perforation 177 longitudinally extending therethrough, and connecting at its open, and top, end 178 with plate 174 in fluidtight relationship therewith and encompassing opening 179 extending through plate 174 in open communication with perforation 177. Elongated valve element 181 in perforation 177 is seated at its seating end 182 against seat 183 in plate 174, axially opening into opening 179**.

As shown, valve element 181 is seated in closed relationship with seat 183 and contains a perforation 186 extending from a point within valve 181 adjacent the seating end 183 to the bottom end 184 and being of increased diameter starting at midway the length of valve 181 to form shoulder 185. Spring element 187 extends in perforation 177 into the larger perforation portion of valve 181 and is supported at its bottom end by variable tension support nut 188 in perforation 177 and at its other end against shoulder 185 from which the smaller portion of perforation 186 extends toward, but short of, seating end 182. Support nut 188 is secured in locked position by subjacent lock nut 189 in a lowermost section of perforation 177. Nuts 188 and 189 are axially perforate. Valve member 181 contains annulus 191 formed along its outer periphery along a section extending downwardly from within a lower portion of its seating end 182, and opens through a plurality of openings 192 in the wall of valve 181 into direct communication with the upper portion of perforation 186.

Either one or both of the spring actuated valve assemblies 173*a* and 173*b* is attached to housing 10 as described. Valve element 181 during operation is in spring biased normally closed position set to open at a predetermined pressure imposed within housing 10. In this manner, each valve 181 is unseated in response to any suitable pressure, i.e. above that required for operation of the piston assembly communicated to housing 10 via conduits 92 and/or 94 (FIG. 1) to permit flow of water from the housing 10 into the annulus 191 of valve 181 and then into perforation 186 and downwardly through perforation 177 to the outside of the assembly 173*a*.

Referring to FIG. 8A, closed elongated housing 190 consists of flangeably joined rear and forward elongated sections 190*a* and 190*b* respectively and contains rear end closure plate 193 flangeably secured to rear end 194, and muzzle member 196 in the forward end 197.

Piston assembly 197 consists of single piston 198 in coaxial alignment, in housing 190, and, as shown, at its rearwardmost point of travel in housing 190. Piston 198 except for rearward portion 199, and rearwardmost end section 201 when the latter is in rearwardmost position, is spaced apart from the inner wall 204 of housing 190 to form an annulus 202 extending completely around piston 198 along a central section of its length.

Piston 198 is supported in its coaxial alignment in housing 190 by forward bearing block support 203 which closes the forward end of housing section 190*a*. Rearward portion 199 of piston 198 extends radially into contact with inner wall 204 of housing 190 and is integral with O-ring support member 206 about its periphery which contains O-ring 207 in fluidtight relationship with end member 199 and in fluidtight and slidable contact with inner wall 204. A short section 195 of the length of piston 198 extends forwardly from member 199 and has a diameter slightly greater than that of the remaining forward portion of piston 198 to form resulting peripheral shoulder 195′. Rear endmost portion 201 of piston 198 at its forward section 200 is of diameter substantially the same as that of section 195 of piston 198 and is slightly greater than that of the remaining rearmost section of member 201 to form resulting peripheral shoulder 200′. Recess 209 of end closure member 193 is coaxial with piston 198 and is dimensioned to accept member 201 when piston 198 is in a rearward position, such as shown. Piston end member 199 and bearing block 203 maintain annulus 202 fluidtight.

Conduit 211 extends through the wall of housing 190 into open communication with annulus 202 at a point adjacent the rear side of bearing block 203. Conduit 212 extends into the rear closure 193 into open communication with opening 209 therein.

Cap closure, or head 213, is threadably secured to the forward end of piston 198 by threaded screw member 214 and contains pin member 216 integral therewith, forwardly and axially extending therefrom. Head 213 is dimensioned to be passed into and through muzzle member 196.

Muzzle member 196 is of construction similar to that of member 18 of FIG. 1 in respect of opening 217 extending through the end of the housing similarly to opening 36 of FIG. 1, and shoulder 218 along the inner wall forming opening 217 of same construction as shoulder 37 of FIG. 1. Conduit 219 extends through passageway 221 in housing wall 190 for delivery of complete charge assemblies into muzzle 196 in the same manner as illustrated with reference to delivery of complete charges into muzzle 18 of FIG. 1.

In the operation of the device of FIG. 8A, any suitable fluid, under pressure, generally air, is passed through conduit 212 into opening 209 in end closure 193 to drive piston assembly 197 forwardly by force of the fluid pressure against endmost members 201 and 199. Piston assembly 197 moves forward until stopped by contact of shoulder 195′ with block 203 to cause member 213 to enter and travel through muzzle 196 in percussion contact with a complete percussion initiatable charge such as of FIG. 5, when emplaced in muzzle 196, in the same manner as illustrated with reference to forward travel of head 44 toward and into and through muzzle 18 of FIG. 1. In the present embodiment, the percussion initiation and ejection are substantially concurrent, piston assembly 197 continuously moving forwardly in shoulder 196 to complete the initiation and ejection.

FIG. 8B shows the identical device of FIG. 8A and illustrates the forwardmost position of single piston assembly 197, i.e. the forward end of piston 198 including head 213 and pin 216 having moved toward, into and through muzzler member 196 to initiate the emplaced cartridge and then force it past the peripheral detent 218 out of the muzzle to the outside of the housing. Obviously, like numbers of FIG. 8B represent like parts of FIG. 8A.

By reversal of fluid flow in housing 190, piston assembly 197 is retracted to its rearward position of FIG. 8A, i.e. by flow of fluid under pressure via conduit 211 into annulus 202 against the forward side of member 199. Conduit 212 serves to vent fluid from housing 190 during rearward travel of piston 198 and conduit 211 serves the same function when piston 198 is moved forwardly.

With reference to FIG. 9A, closed elongated housing 222 consists of flangeably joined rear and forward housing sections 222*a* and 222*b* respectively. Housing 222 contains rear end closure 223, and muzzle member 224, in the forward end, coaxial with housing 222. Muzzle member 224 contains shoulder member 226, all of member 224 being of the same construction as that of muzzle member 196 of FIGS. 8A and 8B.

Piston assembly 227 in housing 222 consists of rear and forward pistons 228 and 229 respectively disposed in partially concentric relationship and coaxially with housing 222. As shown in FIG. 9A, piston assembly 227 is rearwardmost in housing 222 and in that position, as in FIG. 8A, is rearward of the point of ingress of passageway 231 opening into housing 222 to deliver seismic charges into muzzle 224.

Rearward portion *a* of piston 228 extends forwardly in housing section 222*a* and, except for its rear end portion 236, is spaced from housing inner wall 233 to provide peripherally extending annulus 234 around piston 228*a*. Forward section *b* of piston 228 is of diameter smaller that that of section *a* and extends forwardly as described hereinafter.

Rear end member 236 of piston 228 extends radially into contact with inner wall 233 of housing 222. O-ring support 237 about the periphery of end member 236 and integral therewith contains O-ring 240 in fluidtight contact with member 236 and in fluidtight slidable contact with inner wall 233.

Piston 229 is forward of piston 228*a* and contains rear end section *a* radially extending to the inner wall 233 of the housing and maintained in fluidtight slidable relation with inner wall 233 by O-ring seal means 239 supported along the periphery of member 229*a*. Piston 229*a* contains perforation 241 coaxial with housing 222 but of a diameter less than that of forward perforation 238 extending through piston section 229*b* coaxially therewith and in open communication with perforation 241. Piston 229 at its forward end is supported in fluidtight slidable contact with forward wall portion 233*a*, of housing 222, of reduced diameter to the degree shown by shoulder 242 dividing those two wall portions. Shoulder 242 and associated O-ring structure in housing inner wall section 233*a* and piston section 229*a*, including piston section 228*b* extending through perforation 241, form fluidtight annulus 243 about the forward end of piston section 229*b*.

Forward section *b* of piston 228 extends through perforation 241 of piston 229*a* and annulus 243 to a point outside piston section 229*b* terminating rearwardly of the point of ingress of passageway 231 into housing 222 adjacent muzzle 224 as described above. Head member 244 is secured to piston 228*b* at the forwardmost end thereof and pin member 246 generally integral with head 24 extends forwardly of head 244, but terminating at a rearward point of ingress of passageway 231 above described. Conduit 249 extends through the wall of housing 222 immediately forward of shoulder 242 but opening into direct open communication with annulus 243. Conduit 247 extends through the housing wall into annulus 234 so as always to be in direct open communication with the forward side of piston end member 236 and, as shown, is immediately rearward of piston 229*a*, the latter in its rearwardmost position. Conduit 248 extends through closure 223 into housing 222 in direct open communication with the rear side of member 236 of piston 228. Head 244 is dimensioned to travel into and through muzzle 224 and within, and from, perforation 238.

In the operation of the firing device of FIG. 9A and after emplacement of a seismic charge such as one of FIG. 5, in muzzle 224 as illustrated with reference to emplacement of charge in muzzle 18 of FIG. 8A, fluid under pressure, e.g. air, is passed into annulus 234 via conduit 247 to drive piston 229 forward by force of fluid pressure against the rear side of piston section 229*a*. Piston 229 then travels forwardly into muzzle member 224 to supportably contact the emplaced cartridge. This position of piston 229 is shown in FIG. 9B. Forward travel of piston 229 is terminated as is shown in FIG. 9B by contact of the forward side of section *a* against shoulder 242.

With piston 229 supporting emplacement of the cartridge in muzzle 224, fluid under pressure is then passed into housing 222 via conduit 248 against the rear side of end member 236 of piston 228 to drive piston 228 forward and move head 244 and pin 246, integral therewith, through perforation 238 of forward positioned piston 229 and into and through muzzle member 224 to contact pin 246 with the percussion sensitive end of the emplaced cartridge to percussion initiate same. The forward travel of piston 228 is continuous so that its travel against the emplaced cartridge effects initiation and forces the cartridge past the detent 226 of the muzzle 224 to the outside of the housing. This stage is illustrated with reference to FIG. 9C which shows the forwardmost position of the entire piston assembly 227 when ejection is complete.

Forward travel of piston 228 is terminated by contact of the forward side of piston section 228*a* against the rearward side of piston section 229*a* forward travel of the latter being terminated by contact at its forward side with shoulder 242. After ejection is complete, as shown in FIG. 9C, flow of fluid in housing 222 is reversed so that fluid is introduced under pressure via conduit 247 against the forward side of piston end member 236 to move piston 228 into its rearwardmost position and then through conduit 249 against the forward side of end member 229*a* of piston 229 to move piston 229 to its rearwardmost position also as illustrated in FIG. 9A. The cycle is then repeated.

Further exemplary of piston assembly structure of the firing device of the invention is a spring actuated single piston (with firing pin integral and forwardmost) in fluidtight slidable contact, at each end with, and spaced along an intermediate portion of its length from, the housing inner wall to form a resulting centrally disposed fluidtight annulus about the piston. A conduit extends through the housing wall in open communication with the intermediate piston portion for conveying fluid under pressure into the annulus to force rearward travel of the piston and for withdrawing fluid from the housing during forward travel of the piston.

A coil spring assembly is supported in the annulus against the forward end of the piston and at the other end against a ring type stop peripherally disposed about the housing inner wall immediately forward of the forwardmost point of travel of the rearward end of the piston. The coil spring piston is non-biasing in this position, i.e. the forwardmost position of the piston.

Fluid under pressure is delivered into the annulus via the conduit intermediate the rearward end of the piston and the ring stop member to move the piston into its rearwardmost position against the spring. In its rearwardmost spring biased position the piston is supported by any suitable means for releasing it for spring biased forward travel to accomplish initiation and ejection of the emplaced charge.

In one embodiment the spring actuated piston is supported in its rearwardmost position by engaging action of a hook member, rearwardly extending from the piston, with a suitable fastener member extending into the housing rearwardly of the piston and movable into and out of engaging relationship with the hook assembly in response to suitable actuating means therefor.

Although in preferred practice the forward travel of the charge assembly in the muzzle member is terminated for emplacement and the subsequent initiation, it is within the scope of the invention to effect emplacement, initiation and ejection within the muzzle without termination of the forward travel of the charge. This is done by correlating forward travel of the piston assembly with that of the charge so as to effect both initiating and initial ejecting contact with the charge substantially concurrently and peripherally at a rearward point in the muzzle member.

Now preferred detention means in the muzzle member for terminating forward travel of the charge assembly therethrough is of the shoulder type illustrated with reference to FIG. 1. However, any suitable detention means is within the scope of the invention either within or outside the muzzle member. In one such embodiment an upright finger type stop member is yieldably disposed in front of, and suitably spaced from, the forward end of the muzzle member to intercept the line of forward travel of the charge and detain it for emplacement and initiation. The finger stop, at its base, is pivotally secured to the housing at a point out of the path of travel of the cartridge from the muzzle and is spring biased in its position in front of the muzzle to effect the desired detention and yields to move from the path of cartridge travel, by force of contact of the initiated charge moving in response to ejection force of the piston assembly.

In another embodiment of detention means within the muzzle member of the firing device of the invention, a stationary stop is extended in front of, and spaced from, the forward end of the muzzle member to function as a block for forward travel of the charge through the muzzle. In one form of this embodiment the muzzle member is extended enclosed at its forward end to contain the entire emplaced charge, and contains a side opening, positioned and dimensioned, so as to be adjacent and encompass the charge when the latter is in emplaced position. A housed auxiliary piston unit is supported on the exterior wall of the muzzle member opposite the side opening in aligned and open communication with the emplaced charge so as to be movable against the charge to force its ejection from the muzzle by sideward travel through the outside of the housing. Suitable fluid pressure actuating means is extended through the wall of the auxiliary piston housing in operative communication with the piston to move it into and from ejection relationship with the charge in timed relationship with travel of the main piston assembly.

In still another embodiment of detention means within the muzzle member, one or more individual finger, or pin, type obstruction members are extended inwardly into the muzzle member from the muzzle inner wall or either end thereof, a distance not greater than that of the protruding detent from the outer wall of the cartridge shell. The finger, or pin member is shaped and spaced to engage the detention member, i.e. lip or ridge, on the cartridge, in locking position, and the latter being adapted to yield to the finger or pin type detent means in response to ejection force of the piston assembly.

What we claim and desire to protect by Letters Patent is:

1. A system for generating seismic energy in a body of water, said system including storage means for storing a supply of explosively operated seismic charges; a submersed firing station for receiving said charges; conduit means for loading said charges from said storage means into said firing station; initiating means for sequentially initiating the loaded charges; and means for sequential delivery of the initiated charges from said firing station for detonation outside said system.

2. In a system of claim 1, means for sequentially initiating percussion initiatable seismic charges as said explosively operated charges.

3. In a system of claim 2, means for sequentially initiating said charges when each contains an ignitable delay fuse, and for ejecting the initiated charges from said firing station during the period of said delay for said detonation.

4. A system of claim 3, further comprising an elongated conduit for loading said charges from a remote storage; a housing, and an assembly therein, connecting with said elongated conduit for sequentially receiving said charges therefrom and initiating and ejecting same for detonation comprising (1) a muzzle member extending from within said housing to the outside thereof and adapted to sequentially receive and contain said charges with a percussion sensitive portion thereof facing the housing interior and (2) a fluid pressure actuated piston assembly within said housing aligned with said muzzle member along a path extending therethrough from the housing interior to the outside thereof and movable along said path (a) from a position spaced from said muzzle member to contact each such charge, when contained in said muzzle member so as to percussion initiate and eject same to outside said housing and (b) from ejection contact with said charge to said spaced position; fluid pressure generating means connecting with said piston assembly to provide fluid pressure for actuation thereof; and means for regulating flow of fluid under pressure from said generating means to actuate travel of said piston assembly along said path.

5. A system of claim 1 including a movable surface platform, and said storage means supported thereon; a conduit connecting said platform with said firing station; means on said platform for loading the stored explosive charges into said conduit, and means for moving the loaded charges to said firing station; means at said firing station for initiating said charges therein; and means at said firing station operatively associatable with said charges for delaying travel of said charges from said firing station until after initation of same.

6. A system for generating a sequence of seismic pulses in a body of water to provide seismic energy, for a seismic record, substantially equivalent to that generated by a less frequent sequence of stronger seismic pulses, said system including a submersed firing station; initiation means on said station for sequentially initiating explosive seismic charges; and ejection means operatively associated with said initiating means for sequentially ejecting the initiated charges into said body of water for detonation outside the system.

7. A system for generating seismic disturbances in a body of water, said system including a movable boat; a supply of seismic explosive charges on said boat; an elongated seismic streamer cable coupled to said boat for detecting water pressure variations caused by said seismic disturbances; submersed ejection means for sequentially receiving said charges from said boat and ejecting said charges, after initiation of same, from said system; means, including a conduit, for loading said charges from said boat into said ejecting means; initiating means for sequentially initiating the thus loaded charges; and delay fuse means operatively associated with said charges to delay detonation after initiation of same until said charges are ejected from said system.

8. A method for generating seismic energy in a body of water including the steps of storing a supply of explosively operated seismic charges in the marine seismic area; submersing a firing station in said body of water; transporting said charges from said area to the submersed firing station, and sequentially initiating said charges therein; and allowing the initiated charges to sequentially move from said firing station into a predetermined zone outside said firing station for detonation.

9. A method for seismic prospecting in a body of water including the steps of using a single boat for carrying recording and processing equipment; coupling a streamer cable to said boat for detecting water pressure variations caused by seismic disturbances; supplying a plurality of explosively operated seismic charges from said boat to a submersed firing station; firing said explosively operated charges from said submersed firing station; and delaying the detonation of said fired charges to allow said charges to detonate within a predetermined zone outside said firing station.

10. A method for marine seismic exploration including the steps of generating successive seismic disturbances along a predetermined path in a body of water by (1) sequentially initiating explosively operated seismic charges, along said path, at predetermined distances below the surface of the body of water, (2) delaying the detonation of each of the initiated charges, and (3) during the resulting period of delay, delivering each of said initiated charges from the initiation zone into a zone external thereto for detonation; and detecting, with a plurality of spaced detectors, water pressure variations caused by said seismic disturbances.

11. An underwater seismic firing mechanism for receiving and initiating percussion initiatable explosive charges and then ejecting same for subsequent detonation which comprises a housing; a muzzle member extending from within said housing to the outside thereof and adapted to receive and contain a percussion initiatable explosive cartridge assembly with a percussion sensitive portion thereof facing the housing interior; means in direct communication with the outside of said housing and with said muzzle member for conveying percussion initiatable explosive cartridge assemblies thereto so as to be received and contained in said muzzle member; a fluid pressure actuated piston assembly within said housing aligned with said muzzle member along a path extending therethrough from the housing interior to the outside thereof and movable along said path (a) from a position spaced from said muzzle member to contact such cartridge assembly, when contained in said muzzle member, so as to percussion initiate and eject same to outside said housing and (b) from ejection contact with said cartridge assembly to said spaced position; and means for communicating fluid pressure actuating means with said piston assembly for moving same along said path.

12. In a firing mechanism of claim 11, said housing being elongated and said piston assembly and said muzzle member being disposed coaxially therewith, and said muzzle member extending through a forward end wall of said housing; said means for conveying cartridge assemblies comprising a passageway opening through a wall of said housing in a direction toward said muzzle member and into an interior housing section adjacent thereto; and said spaced position of said piston assembly being rearward of ingress of said passageway into said housing.

13. In a firing mechanism of claim 12, means for detaining forward travel of such cartridge assembly through said muzzle member until after percussion initiation of same.

14. In a firing mechanism of claim 13, a shoulder member peripherally extending about the inner wall of said muzzle member, and facing the housing interior, as said means for detaining said cartridge travel.

15. An underwater firing mechanism for sequentially receiving percussion initiatable explosive charge assemblies and emplacing, initiating, and then ejecting same for subsequent detonation, comprising an elongated housing; a muzzle member coaxially extending through a forward end wall of said housing to the outside thereof in open communication with the housing interior so as to thereby receive, from within said housing, a forwardly, substantially coaxially, moving percussion initiatable explosive cartridge assembly with a percussion sensitive portion thereof facing the housing interior; passageway means, for successively conveying such cartridge assemblies into said housing, opening through a wall of said housing into direct communication with the housing interior and spaced at its ingress end on the housing inner wall rearwardly of, and in a direction toward, said muzzle member, and toward an opposite housing inner wall portion for conveying said cartridge assemblies against said opposite inner wall for successive deflection of said assemblies, percussion end last, into said muzzle member; a fluid pressure actuated piston assembly coaxially disposed within said housing and movable in both directions along its axis when said axis is extended into, and through at least a portion of, said muzzle member from a position rearward of said ingress of said passageway; detention means on the inner wall of said muzzle member, operatively associatable with each said explosive cartridge assembly for stopping forward travel of each said assembly therethrough; fluid pressure actuating means communicating with said piston assembly to move same along said axis into said muzzle in percussive contact with an explosive cartridge assembly when detained in said muzzle to thereby initiate said assembly and drive said cartridge assembly to forcibly overcome said detaining means for ejection of said cartridge assembly from said muzzle member for subsequent detonation.

16. In an underwater firing mechanism of claim 15, said piston assembly comprising a combination of three concentrically disposed pistons, and the outermost and intermediate of said pistons being perforate along their entire lengths; said intermediate piston extending from concentric relationship with said outermost piston toward said muzzle member, and a head member at the forward end of said intermediate piston coaxially and commonly perforate, therewith; the innermost of said pistons terminating its concentric relationship with said intermediate piston in a forward end of said intermediate piston, and a firing pin assembly, including a firing pin forward thereof, concentrically within said intermediate piston and forward of said innermost piston; said intermediate piston being forwardly movable to move said head member into and through said muzzle member, and to concurrently engage and to forwardly move said firing pin assembly with said head member; said innermost piston, in said concentric relationship, being forwardly movable to contact said firing pin assembly when said firing pin is within said muzzle; said outermost piston being adapted to engage said intermediate piston member after forward travel of same toward said muzzle member and to then move forwardly and concurrently engage, and move, said intermediate piston sufficiently to force travel of said head member through said muzzle; means for communicating each said piston with force of fluid pressure to successively move same forwardly in the above described sequence of intermediate innermost and outermost piston travel; and means for then communicating said pistons with force of fluid pressure for rearwardly moving same along said axis to said rearward position; and means for moving said firing pin assembly from within said muzzle member to its rearwardmost position in response to rearward travel of said innermost piston.

17. In an underwater firing mechanism of claim 15, said piston assembly comprising a combination of first and second pistons, and each said piston having a rearmost section larger than the remaining forward section; said first piston containing a perforation axially extending therethrough but of reduced size within the rear section thereof; said second piston being disposed with said rearmost section thereof rearward of said first piston and said forward section thereof extending into said first piston through the perforate rear section thereof and adapted to travel axially through the perforate forward section of said first piston; a head member, and firing pin forward thereof, at the forward end of said second piston and adapted to move with said second piston through the forward perforate section of said first piston; said first piston being movable along said extended axis into a peripheral portion of said muzzle member to contact such a cartridge assembly when detained in said muzzle as described; and said second piston being forwardly movable to move the forward end thereof through the forward perforation of said first piston into said muzzle to contact such cartridge, when detained as described, with force of percussion to cause initiation of same, and to continue forward travel through said muzzle to forcibly eject such cartridge therefrom; each said piston being movable along said extended axis in response to force of fluid pressure; means for communicating each said piston with force of fluid pressure to successively move same as described; and means for communicating each said piston with force of fluid pressure for then moving same to said rearward position.

18. In an underwater firing mechanism of claim 15, said piston assembly comprising a single piston member, and a firing pin at the forward end thereof.

19. A seismic cartridge unit, for operative association with a percussion initiatable primer device and percussion firing in an underwater firing device comprising a cartridge shell and means, including an end wall closure, for enclosing at least a portion of the interior of said shell; a seismic explosive charge within the closed shell portion; a primer well extending, closed end first, into said closed shell portion through said wall member into operative contact with said explosive charge for support of a percussion initiatable primer device therefor, and supported at its open end in said wall member; and said cartridge shell having a deformable protruding exterior side portion for initially engaging an external stop means, and adapted for a subsequent deformation type release of said cartridge unit during travel of same through a passageway.

20. In a seismic cartridge unit of claim 19, a percussion initiatable primer device extending, percussion sensitive portion last, into the primer well in priming contact relationship with said explosive charge and terminating within said well so as to dispose the percussion sensitive portion thereof outside the closed shell interior at least flush with the exterior open end surface of said well member; and said primer device containing a fuse composition for delay of its priming action to thereby delay detonation of said explosive charge after percussion initiation of said primer.

21. In a cartridge unit of claim 19, said wall closure member being positioned from an end of said cartridge shell to form a resulting open recessed end portion.

22. A seismic charge assembly of claim 20 wherein said wall member is spaced from an end of said shell to form a resulting open recessed shell end portion, and is of sufficient rigidity to support power impact for ejection of said assembly through a passageway.

23. In a cartridge unit of claim 19, said protruding side portion comprising at least one ridge member peripherally extending about said cartridge shell as an integral part thereof.

24. In an assembly of claim 20, said percussion sensitive portion of said primer device being an empty primed rifle cartridge case.

25. An assembly of claim 24 wherein said empty primed rifle cartridge case is rim fired.

26. A seismic cartridge unit of claim 19 wherein said seismic explosive charge is of the NCN type.

27. An assembly of claim 20 wherein said seismic explosive charge is of the NCN type.

28. A complete explosive cartridge assembly for firing in an underwater firing device comprising an elongated cartridge shell; means for enclosing a portion of the interior of said cartridge shell including a wall closure member spaced from an end thereof to form a resulting recessed shell end portion; an NCN type seismic explosive charge within the enclosed portion of said shell; a primer well extending closed end first into the interior of said cartridge shell through said wall member into operative contact with said explosive charge for supporting a percussion initiatable primer device therefor, and supported at its open end in said wall member in open communication with said recessed portion; said percussion initiatable primer device comprising an elongated closed primer shell including a rim-fired empty primed rifle cartridge casing, as an end closure, with the ignition charge thereof in open communication with the primer shell interior; in said primer shell, (1) a high explosive, as a base charge, spaced from said ignition charge, (2) a primer charge, intermediate said ignition charge and said base explosive charge, and (3) a delay fuse intermediate said primer charge and said ignition charge and spaced from said ignition charge; said base explosive charge being detonatable in response to detonation of said primer charge and spaced in detonating relationship therewith, said primer charge being detonatable in response to burning of said delay fuse and spaced in detonating relationship therewith, and said delay fuse being ignitible in response to ignition of said ignition charge; said primer device extending into said primer well, with said rim-fired casing end last, into priming contact relationship with said explosive charge, so as to dispose said rim-fired empty primed rifle casing end portion at least flush with the exterior open end surface of said primer well; and said cartridge shell having a peripherally, deformable, and outwardly protruding ridge member on the exterior thereof in a plane substantially perpendicular to the shell axis for initially engaging an external stop means therefor and adapted for a subsequent deformational type release of said cartridge assembly during travel of same through a passageway.

29. In a mechanism of claim 11, a normally closed pressure actuated valve connecting through the wall of said housing in direct open communication with said piston assembly, and adapted to open in response to actuation at a predetermined pressure higher than that required for operating said piston assembly.

References Cited

UNITED STATES PATENTS

| | | | |
|---|---|---|---|
| 2,803,807 | 8/1957 | Butler | 340—8 |
| 2,954,734 | 10/1960 | Kendall et al. | 102—70.2 |
| 2,968,274 | 1/1961 | Estes et al. | 114—240 |
| 3,368,510 | 2/1968 | Humphrey | 114—16 |

BENJAMIN A. BORCHELT, Primary Examiner

T. H. WEBB, Assistant Examiner

U.S. Cl. X.R.

340—7, 8